(12) United States Patent
Abraham et al.

(10) Patent No.: US 10,425,193 B2
(45) Date of Patent: Sep. 24, 2019

(54) RESOURCE REQUIREMENT SIGNALING AND RATE SETTING

(71) Applicant: QUALCOMM Incorporated, San Diego, CA (US)

(72) Inventors: Santosh Paul Abraham, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 15/264,447

(22) Filed: Sep. 13, 2016

(65) Prior Publication Data
US 2017/0188385 A1 Jun. 29, 2017

Related U.S. Application Data

(60) Provisional application No. 62/387,496, filed on Dec. 23, 2015.

(51) Int. Cl.
H04W 4/00 (2018.01)
H04L 1/00 (2006.01)
H04L 29/06 (2006.01)
H04L 5/00 (2006.01)
H04W 72/12 (2009.01)
H04W 28/02 (2009.01)
H04W 72/04 (2009.01)
H04W 84/12 (2009.01)
H04W 74/08 (2009.01)

(52) U.S. Cl.
CPC .......... *H04L 1/0083* (2013.01); *H04L 5/003* (2013.01); *H04L 69/22* (2013.01); *H04W 28/0205* (2013.01); *H04W 72/1215* (2013.01); *H04W 72/1252* (2013.01); *H04W 72/1284* (2013.01); *H04W 72/0453* (2013.01); *H04W 74/085* (2013.01); *H04W 84/12* (2013.01)

(58) Field of Classification Search
None
See application file for complete search history.

(56) References Cited

U.S. PATENT DOCUMENTS

| 9,807,797 B2* | 10/2017 | Cheong | H04W 74/04 |
| 2009/0046642 A1 | 2/2009 | Damnjanovic | |
| 2010/0135229 A1 | 6/2010 | Loehr et al. | |
| 2010/0208665 A1 | 8/2010 | Vivanco et al. | |
| 2011/0287794 A1* | 11/2011 | Koskela | H04W 28/08 455/509 |
| 2012/0320772 A1* | 12/2012 | Frederiks | H04L 47/10 370/252 |

(Continued)

OTHER PUBLICATIONS

International Search Report and Written Opinion—PCT/US2016/067343—ISA/EPO—dated Mar. 20, 2017.

*Primary Examiner* — Farah Faroul
(74) *Attorney, Agent, or Firm* — Loza & Loza LLP

(57) ABSTRACT

The disclosure relates in some aspects to resource requirement signaling and rate setting for communication on an unlicensed band. The disclosure also relates in some aspects to determining a token arrival rate as a function of traffic arrival information. In some aspects, the disclosed schemes may avoid traffic collisions on a resource and promote access fairness on the resource.

27 Claims, 31 Drawing Sheets

(56) References Cited

U.S. PATENT DOCUMENTS

| | | | |
|---|---|---|---|
| 2013/0336156 A1* | 12/2013 | Wei | H04L 5/001 370/252 |
| 2014/0126443 A1* | 5/2014 | Chizgi | H04W 52/02 370/311 |
| 2014/0307552 A1 | 10/2014 | Elsherif et al. | |
| 2014/0378157 A1* | 12/2014 | Wei | H04W 16/14 455/454 |
| 2015/0103777 A1* | 4/2015 | Chen | H04W 76/15 370/329 |
| 2015/0312793 A1 | 10/2015 | Jeon et al. | |
| 2016/0021577 A1* | 1/2016 | Du | H04W 74/0816 370/336 |
| 2016/0119933 A1* | 4/2016 | Merlin | H04L 5/0048 370/312 |
| 2016/0128130 A1 | 5/2016 | Sadek et al. | |
| 2016/0249224 A1* | 8/2016 | Prasad | H04W 16/14 |
| 2017/0127440 A1* | 5/2017 | Chun | H04W 72/1284 |
| 2017/0230839 A1* | 8/2017 | Cui | H04W 16/14 |
| 2017/0289911 A1* | 10/2017 | Kim | H04W 52/0235 |

* cited by examiner

RESOURCE REQUIREMENT SIGNALING AND RATE SETTING

CROSS-REFERENCE TO RELATED APPLICATION(S)

This application claims priority to and the benefit of provisional patent application No. 62/387,496 filed in the U.S. Patent and Trademark Office on Dec. 23, 2015, the entire content of which is incorporated herein by reference.

INTRODUCTION

Various aspects of the present disclosure relate generally to wireless communication and more particularly, but not exclusively, to resource requirement signaling and rate setting.

Wireless communication networks are widely deployed to provide various communication services such as telephony, video, data, messaging, broadcasts, and so on. Such networks, which are usually multiple access networks, support communications for multiple users by sharing the available network resources.

As the demand for mobile broadband access continues to increase, research and development continue to advance wireless communication technologies not only to meet the growing demand for mobile broadband access, but to advance and enhance the user experience.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: determine that information is to be communicated via an unlicensed radio frequency (RF) band; generate an indication of a resource requirement for communication of the information via the unlicensed RF band; and send the indication to an entity that schedules at least one resource on the unlicensed RF band for communication of the information.

Another aspect of the disclosure provides a method for communication including: determining that information is to be communicated via an unlicensed radio frequency (RF) band; generating an indication of a resource requirement for communication of the information via the unlicensed RF band; and sending the indication to an entity that schedules at least one resource on the unlicensed RF band for communication of the information.

Another aspect of the disclosure provides an apparatus configured for communication. The apparatus including: means for determining that information is to be communicated via an unlicensed radio frequency (RF) band; means for generating an indication of a resource requirement for communication of the information via the unlicensed RF band; and means for sending the indication to an entity that schedules at least one resource on the unlicensed RF band for communication of the information.

Another aspect of the disclosure provides a non-transitory computer-readable medium storing computer-executable code, including code to: determine that information is to be communicated via an unlicensed radio frequency (RF) band; generate an indication of a resource requirement for communication of the information via the unlicensed RF band; and send the indication to an entity that schedules at least one resource on the unlicensed RF band for communication of the information.

In one aspect, the disclosure provides an apparatus configured for communication that includes a memory and a processor coupled to the memory. The processor and the memory are configured to: receive an indication of a resource requirement for communication of information via an unlicensed radio frequency (RF) band; schedule at least one resource on the unlicensed RF band for communication of the information; and receive the information over the unlicensed RF band according to the scheduled at least one resource and a token arrival time.

Another aspect of the disclosure provides a method for communication including: receiving an indication of a resource requirement for communication of information via an unlicensed radio frequency (RF) band; scheduling at least one resource on the unlicensed RF band for communication of the information; and receiving the information over the unlicensed RF band according to the scheduled at least one resource and a token arrival time.

Another aspect of the disclosure provides an apparatus configured for communication. The apparatus including: means for receiving an indication of a resource requirement for communication of information via an unlicensed radio frequency (RF) band; means for scheduling at least one resource on the unlicensed RF band for communication of the information; and means for receiving the information over the unlicensed RF band according to the scheduled at least one resource and a token arrival time.

Another aspect of the disclosure provides a non-transitory computer-readable medium storing computer-executable code, including code to: receive an indication of a resource requirement for communication of information via an unlicensed radio frequency (RF) band; schedule at least one resource on the unlicensed RF band for communication of the information; and receive the information over the unlicensed RF band according to the scheduled at least one resource and a token arrival time.

In one aspect, the disclosure provides an apparatus configured for communication that includes a memory and a processor coupled to the memory. The processor and the memory are configured to: determine traffic arrival information; determine a token arrival rate as a function of the traffic arrival information; and communicate information over an unlicensed radio frequency (RF) band at times based on the token arrival rate.

Another aspect of the disclosure provides a method for communication including: determining traffic arrival information; determining a token arrival rate as a function of the traffic arrival information; and communicating information over an unlicensed radio frequency (RF) band at times based on the token arrival rate.

Another aspect of the disclosure provides an apparatus configured for communication. The apparatus including: means for determining traffic arrival information; means for determining a token arrival rate as a function of the traffic arrival information; and means for communicating information over an unlicensed radio frequency (RF) band at times based on the token arrival rate.

Another aspect of the disclosure provides a non-transitory computer-readable medium storing computer-executable code, including code to: determine traffic arrival information; determine a token arrival rate as a function of the traffic arrival information; and communicate information over an unlicensed radio frequency (RF) band at times based on the token arrival rate.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
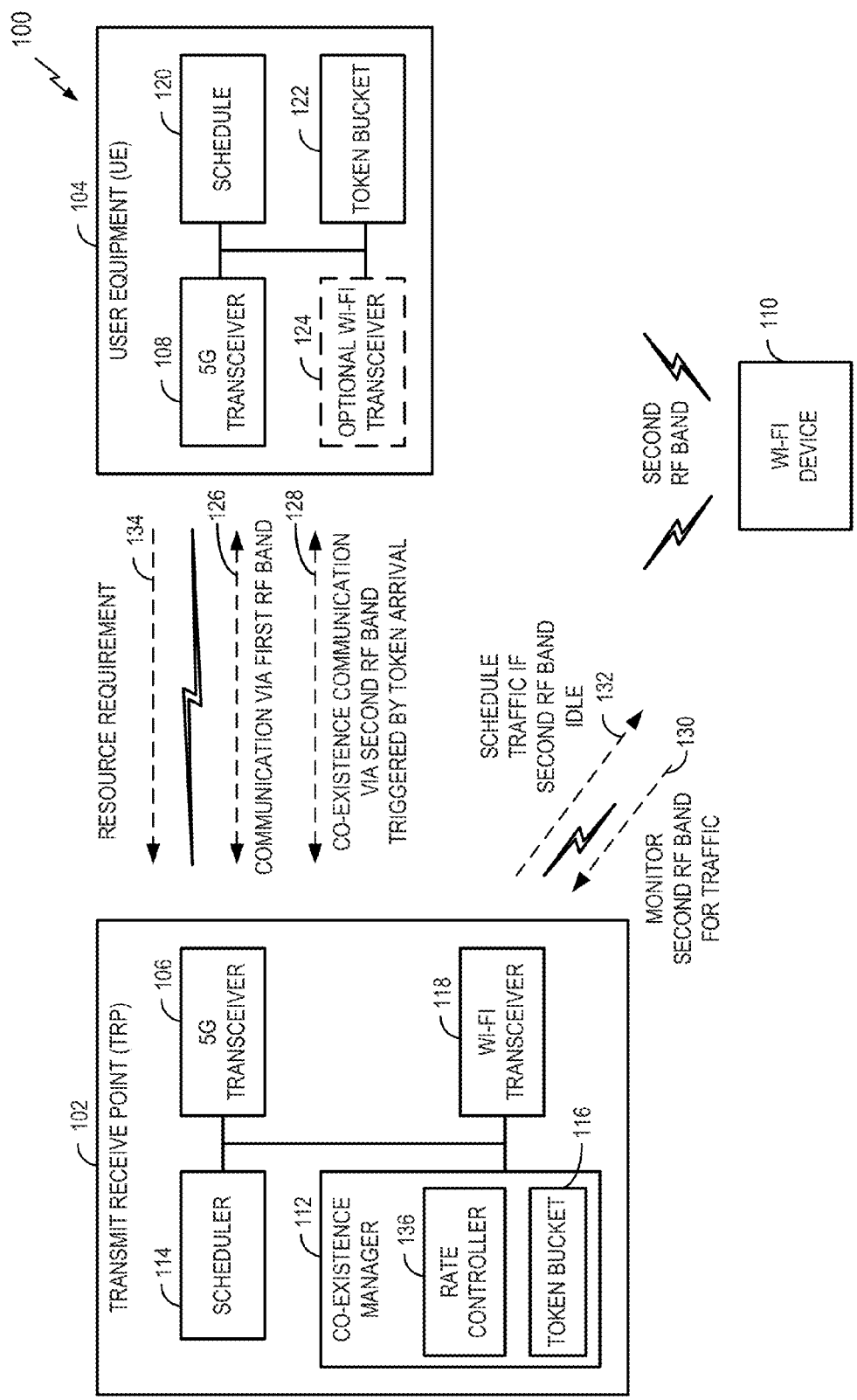
FIG. 1 is a block diagram illustrating an example of a resource requirement signaling and rate control scheme in accordance with some aspects of the disclosure.

The disclosure relates in some aspects to signaling a resource requirement so that a scheduling entity (e.g., a transmit receive point, a base station, etc.) can know how many resources (e.g., uplink resources) to schedule when a token arrives. For example, a user equipment (UE) may send an uplink resource request to its serving transmit receive point (TRP) to request uplink resources from the TRP when the UE is in-between TRP scheduled periods for unlicensed access.

The disclosure also relates in some aspects to setting the token rate to be used to ensure sufficient throughput for 5G traffic while accommodating Wi-Fi traffic (or other traffic). For example, a maximum token rate may be set to ensure a sufficient Wi-Fi frame arrival rate. The 5G traffic arrival rate may then be set based on the token arrival rate. In some aspects, given a rate requirement for uplink and downlink traffic, a TRP chooses an appropriate token rate to ensure that the traffic streams can be satisfied. For example, based on measured requirements of device traffic and observed Wi-Fi traffic, upper and lower bounds on the token rate required may be obtained.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, fifth generation (5G) technology, fourth generation (4G) technology, third generation (3G) technology, and other network architectures.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

5G with Wi-Fi Co-Existence

The industrial, scientific, and medical radio band (ISM band) and the unlicensed national information infrastructure radio band (U-NII band) are candidates for 5G radio access technologies. Current users in these bands typically use Wi-Fi radio access technology, with an ever growing share of the number of devices in this band.

The disclosure relates in some aspects to resource requirement signaling and rate setting for communication on an unlicensed band. This signaling and rate selection may be used in a token bucket-based access scheme for 5G access to unlicensed bands. For each token in the token bucket, a device is allowed to access the medium for a scheduled block of time that occurs at the time of availability of the token. In an example implementation, the block of time is 5 millisecond (ms). Other block lengths may be used. These unlicensed bands may be used by devices that use a wireless local area network (WLAN) technology such as Wi-Fi. These techniques are also applicable to other types of radio access technologies (e.g., 3G, 4G, WiMAX, and so on).

In some aspects, the term token bucket refers to an algorithm that controls whether an action can be performed based on whether a token is available (e.g., whether there are any tokens in the token bucket). A token can be any indication suitable for controlling the action. It should be appreciated that the terms token and token bucket cover any type of technique that provides the above functionality or any other type of token bucket-related functionality, irrespective of whether that technique uses the term token or token bucket.

FIG. 1 illustrates an example of a communication system 100 that supports communication co-existence in accordance with the teachings herein. The communication system 100 includes a transmit receive point (TRP) 102 that communicates 126 with a user equipment (UE) 104 via a first radio frequency (RF) band. Typically, the communication system 100 will include other wireless communication devices (e.g., other TRPs and UEs). To reduce the complexity of FIG. 1, however, only one TRP and one UE are shown.

In some aspects, a TRP may refer to a physical entity that incorporates radio head functionality for a particular physical cell. This functionality may be similar in one or more aspects to (or incorporated into) the functionality of a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar entity.

The TRP 102 includes a 5G transceiver 106 and the UE 104 includes a 5G transceiver 108 for the communication 126 via the first RF band (and optionally other RF bands). As discussed below, each transceiver may include PHY layer functionality and media access control (MAC) layer functionality. In accordance with the teachings herein, the TRP 102 and the UE 104 may also communicate 128 via a second RF band that is being used by a Wi-Fi device 110. To this end, the TRP 102 includes a co-existence manager 112, a scheduler 114, a token bucket 116, and a rate controller 136 that collectively are used to avoid collisions and ensure access fairness on the second RF band.

The first and second RF bands might or might not overlap. In some scenarios, the second RF band does not overlap with the first RF band. In some scenarios, the second RF band partially overlaps with the first RF band. In some scenarios, the second RF band is entirely within the first RF band. In some scenarios, the first RF band is entirely within the second RF band.

The TRP 102 uses the token bucket 116 to ensure access fairness, for example, by limiting access to the second RF band according to a token arrival rate. Once a token arrives (e.g., is added to the token bucket 116), the co-existence manager 112 may monitor 130 the second RF band (e.g., using a Wi-Fi transceiver 118) to determine whether the second RF band is idle. If so, the co-existence manager 112 causes a clear-to-send (CTS) or some other suitable type of signal to be sent 132 over the second RF band (e.g., using the Wi-Fi transceiver 118) to reserve the second RF band for 5G communication. If the TRP 102 ends up using the second RF band (e.g., during a scheduled access block), a token is deleted from the token bucket. If the TRP 102 does not end up using the second RF band during the access block (e.g., the second RF band is not idle), a token is not deleted from the token bucket. Thus, tokens may be accumulated at the TRP 102, up to a maximum token limit.

The scheduler 114 defines the schedule to be used by the TRP 102 and the UE 104 for 5G communication 128 on the second RF band. In one aspect, relatively short frames are scheduled (e.g., for an access block) to ensure that Wi-Fi devices (e.g., including the Wi-Fi device 110) have adequate access to the second RF band.

The TRP 102 sends its schedule and token bucket information (signaling not shown) to the UE 104. For example, the TRP 102 may send this information via a control channel such as a physical downlink control channel (PDCCH) or via some other suitable signaling technique. The schedule and token bucket information may include, for example, an indication of the specific time slots that are scheduled for 5G communication on the second RF band as well as token bucket parameters (e.g., token arrival rate, maximum number of tokens, etc.).

Thus, the UE 104 maintains its own instance of a schedule 120 for 5G communication 128 on the second RF band and its own instance of a token bucket 122 (e.g., that mirrors the token bucket 116). This enables the UE 104 to monitor the second RF band at the times the TRP 102 is expected to commence 5G communication 128 on the second RF band. For example, at a defined token arrival time (e.g., as defined by the schedule 120 and/or the parameters of the token bucket 122), the UE 104 may switch its 5G communication from the first RF band (or wake from a low power state) to communicate via the second RF band. The UE 104 may confirm that a 5G communication 128 from the TRP 102 is beginning during a scheduled access block on the second RF band upon receipt of a downlink signal from the TRP 102. If the UE 104 detects a downlink signal, the UE 104 proceeds with the 5G communication 128 and deletes a token from the token bucket 122. If the UE 104 does not detect a downlink signal, the UE 104 does not delete a token from the token bucket 122 and may go back to sleep until the next token arrival time. In some implementations, the UE 104 may include a Wi-Fi transceiver 124 for monitoring the second RF band to determine whether the second RF band is clear (or sufficiently clear for 5G communication) in the vicinity of the UE 104.

The disclosure relates in some aspects to a method for UEs or other devices to communicate an uplink resource requirement. In FIG. 1, the UE 104 sends a resource requirement 134 (e.g., via an uplink resource request) to the TRP 102 so that the TRP 102 can determine, for example, how many uplink resources to schedule when a token arrives. In some aspects, the rate controller 136 may set the token rate to be used for the token bucket algorithm to ensure sufficient accommodation of Wi-Fi traffic and to ensure throughput for 5G traffic.

Figure 2:
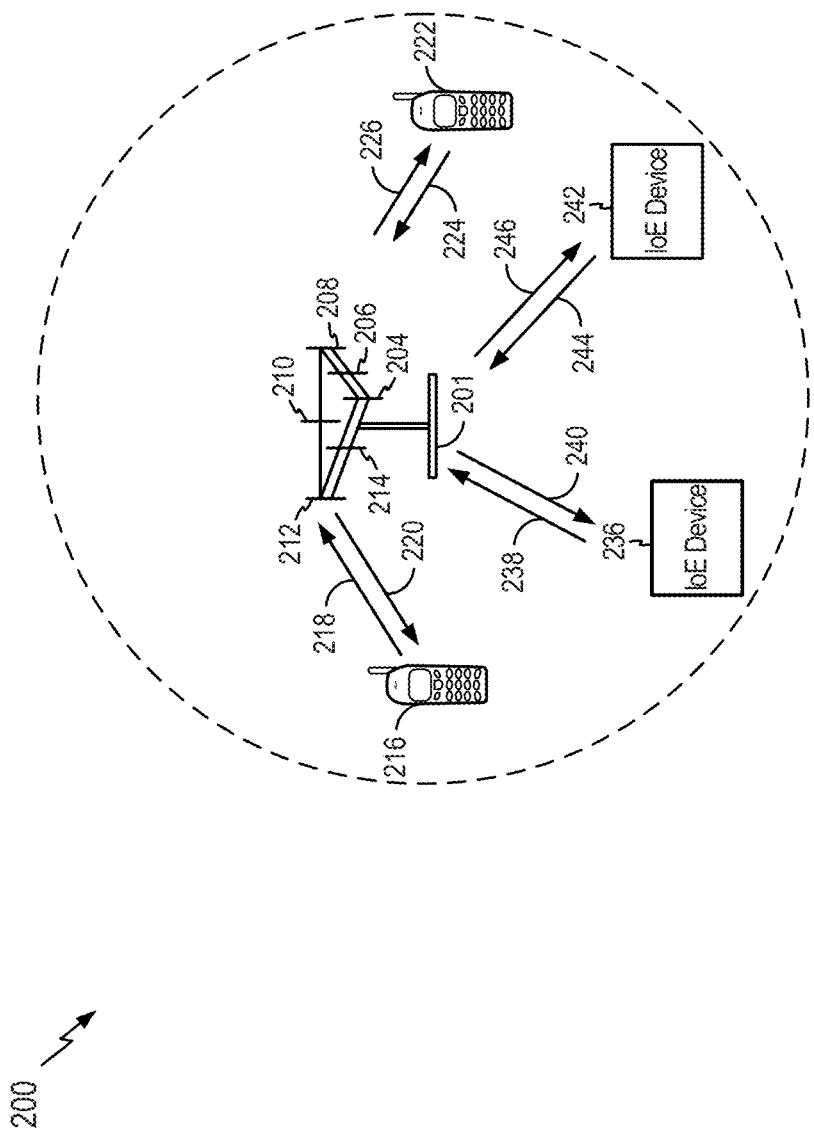
FIG. 2 is a diagram illustrating an example of a multiple access wireless communication system within which aspects of the disclosure may find application.

FIG. 2 illustrates an example communication network 200 in which aspects of the present disclosure may be performed. For example, techniques presented herein may be used to share a common set of resources between various devices having different priority levels. The communication network includes a TRP 201 and several wireless communication nodes (discussed below). In some implementations, the TRP 201 and the wireless communicate nodes of FIG. 2 may correspond to the TRP 102 and the UE 104 of FIG. 1, respectively.

In the example of FIG. 2, the TRP 201 includes multiple antenna groups, one group including antennas 204 and 206, another group including antennas 208 and 210, and an additional group including antennas 212 and 214. In FIG. 2, two antennas are shown for each antenna group, however, more or fewer antennas may be utilized for each antenna group. A wireless communication node 216 (e.g., a UE) may be in communication with the antennas 212 and 214, where the antennas 212 and 214 transmit information to the wireless node 216 over a forward link 220 and receive information from the wireless communication node 216 over a reverse link 218. A wireless communication node 222 may be in communication with the antennas 204 and 206, where the antennas 204 and 206 transmit information to the wireless communication node 222 over a forward link 226 and receive information from the wireless communication node 222 over a reverse link 224. The TRP 201 may also be in communication with other wireless communication nodes, which may be, for example, Internet-of-Everything (IoE) devices. An IoE device 236 may be in communication with one or more other antennas of the TRP 201, where the antennas transmit information to the IoE device 236 over a forward link 240 and receive information from the IoE device 236 over a reverse link 238. An IoE device 242 may be in communication with one or more other antennas of the TRP 201, where the antennas transmit information to the IoE device 242 over a forward link 246 and receive information from the IoE device 242 over a reverse link 244. In a Frequency Division Duplex (FDD) system, the communication links 218, 220, 224, 226, 238, 240, 244, and 246 may use different frequencies for communication. For example, the forward link 220 may use a different frequency than that used by the reverse link 218, and forward link 240 may use a different frequency than that used by reverse link 238.

Example Signaling for 5G with Wi-Fi Co-Existence

Figure 3:
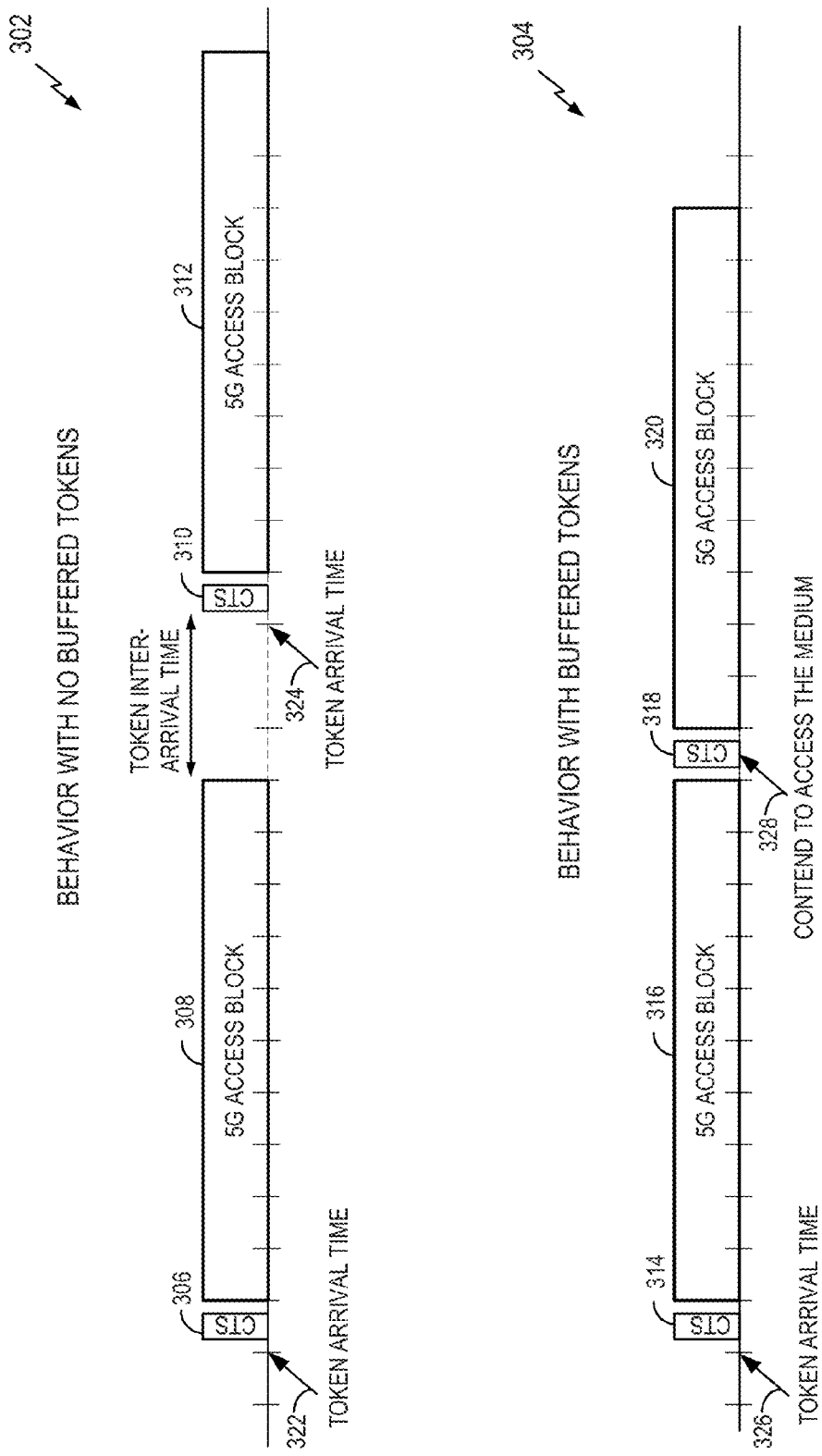
FIG. 3 is a diagram illustrating examples of token bucket-based communication in accordance with some aspects of the disclosure.

An example of an access technique for a TRP and a UE will now be described with reference to FIGS. 3-4. Referring initially to FIG. 3, this figure illustrates a token bucket-based access technique that may be used by a TRP (or some other type of scheduling entity) to control communication on the next scheduled access block of sub-frames (or slots). In some aspects, this technique may allow for UEs (e.g., stations, STAs) to wake up close to (e.g., shortly before) the scheduled block of sub-frames.

A TRP may initiate a sub-frame sequence. In one example, each sub-frame is 0.5 ms. Only a subset of the available sub-frames is utilized for 5G communication. For example, the number of contiguous sub-frames used for 5G could be limited to ten (10) or some other suitable number. This helps to ensure that the medium is not blocked for too long of a period of time (e.g., no longer than 5 ms).

Each TRP may be configured with the following token bucket information: a token fill rate and a maximum number of tokens. For each token in the token bucket, a device (e.g., a TRP or a UE) is allowed to access the medium during an access block (e.g., a 5 ms block) that occurs at the time of availability of the token (e.g., the token arrival time).

As discussed above, every UE served by a particular TRP may be provided with that TRP's token bucket parameters. Accordingly, a UE will know the token arrival time for the TRP and can therefore determine the exact time that the TRP has a token. Thus, a UE may elect to wake up from a low power (e.g., sleep) mode at the time the UE determines that the TRP has a token.

Tokens may accumulate in a token bucket. For example, a TRP may accumulate a token for every block of time the TRP does not utilize (e.g., due to lack of traffic to send or due to traffic on the channel). The number of tokens accumulated in the token bucket can be controlled to ensure that the number does not exceed a maximum number.

FIG. 3 illustrates example timing diagrams 302 and 304 for a token bucket-based access technique. The timing diagram 302 corresponds to a scenario where the token bucket is empty upon completion of a first access block. The timing diagram 304 corresponds to a scenario where the token bucket still contains at least one token upon completion of a first access block.

Referring first to the timing diagram 302, the following access operation may be performed by a TRP when a token is present (e.g., following a token arrival time 322). A Wi-Fi MAC of the TRP begins a clear channel assessment (CCA) procedure or some other type of medium contention procedure a period of time (e.g., X microseconds, μs) prior to the first scheduled sub-frame. For example, if the medium is detected as idle, the TRP may send out a clear-to-send (CTS) 306 to reserve the medium for a period of time corresponding to an access block 308 (e.g., the subsequent 10 sub-frames). In some implementations, an address of the CTS 306 may be set to an address reserved for 5G operation. In this way, a device that receives the CTS 306 can determine that the CTS 306 relates to a scheduled 5G communication. Since the token bucket is empty after completion of the access block 308 in this example, the TRP may wait until the next token arrival time 324 to send another CTS 310 to reserve the time for another access block 312.

The following access operations may be performed at the UEs. As discussed above, the UEs can track the token bucket used by the TRP. Accordingly, a UE can wake up slightly prior to the start of a 5G access block and determine whether the TRP has a token. Upon determining that the TRP has started the sequence of sub-frames of an access block, the UE participates in each of the sub-frames according to the schedule provided by the TRP. In some implementations, the first sub-frame of a 5G access block begins with a downlink transmission (e.g., even if the sub-frame is designated as uplink-centric). Thus, a UE may monitor for this downlink transmission (not shown in FIG. 3) to determine whether the TRP will be communicating during the 5G access block.

Referring to the timing diagram 304, the following access operation may be performed by a TRP when a token bucket contains multiple tokens (e.g., following a token arrival time 326). If the medium is detected as idle, the TRP sends out a CTS 314 to reserve the medium for a period of time corresponding to an access block 316. Since there is still at least one token in the token bucket after completion of the access block 316 in this example, the TRP may immediately (e.g., at a time 328 prior to a next token arrival time) send another CTS 318 to contend for access to the medium (e.g., reserve the time for another access block 320).

Due to CCA conditions, access during the first possible sub-frame might not be possible. In this case, the TRP may persist with the contention procedure until the CTS is sent. At the sub-frame that is subsequent to this CTS, the TRP initiates communication for the 5G sub-frames (e.g., the remaining portion of the 5G access block).

If the CCA procedure at the TRP does not allow for CTS transmission within the sub-frame prior to the desired start of the 5G access block, one of two options may be followed in a representative implementation. In a first option (Option 1), the TRP persists with the CCA/contention until the CTS can be sent. Here, UEs (STAs) may remain awake until communication commences on one of the 5G sub-frames. A new token may arrive during the contention period.

In a second option (Option 2), the TRP persists with CCA/contention for a known duration (e.g., a defined number of sub-frames). If a CTS still cannot be sent (e.g., after two sub-frames), the TRP stores the token and restarts the 5G access operation at the next token arrival time.

In view of Options 1 and 2, the following operations may be performed in the event a TRP has accumulated multiple tokens in the token bucket (e.g., the scenario associated with the timing diagram 304). As soon as a 5G access block is completed, the TRP starts contending for the next CTS to send. Also, the UEs will be aware that the TRP has more tokens in the token bucket. Consequently, the UEs may persist in the wake state. If the TRP cannot access the medium again, the TRP persists according to behavior described in Option 1 or Option 2.

In some implementations, CCA is also implemented at a UE. For example, a UE that detects high interference in its neighborhood may elect to not communicate during the next 5G access block.

Figure 4:
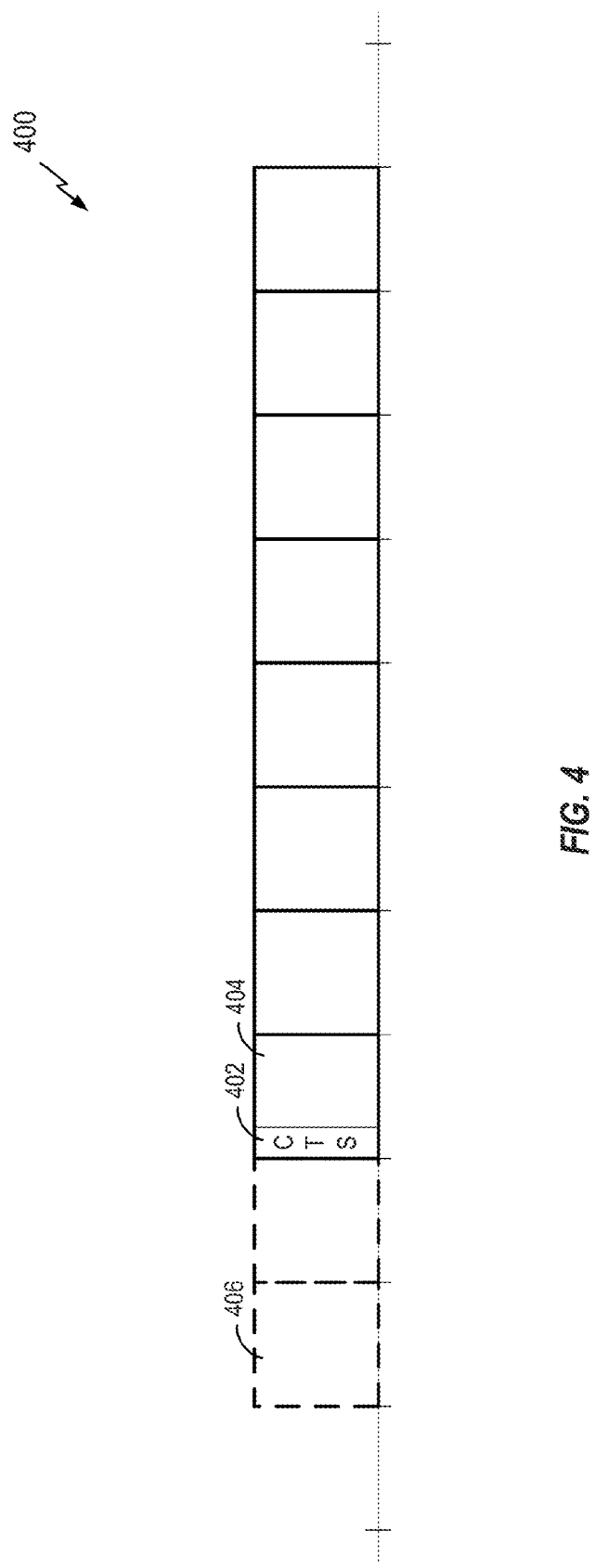
FIG. 4 is a diagram illustrating an example of an access block in accordance with some aspects of the disclosure.

Referring now to FIG. 4, in some implementations, a sub-frame may include at least one CTS. In this case, the access block might not be preceded by a CTS. FIG. 4 illustrates an example of such an implementation. Here, an access block 400 (consisting of ten sub-frames) is not preceded by a CTS. Instead, a CTS (e.g., a CTS-to-self) 402 may be included in one or more of the sub-frames (e.g., as illustrated for a sub-frame 404) of the access block 400. FIG. 4 also illustrates that a CTS (or data) might not be communicated in one or more of the sub-frames (e.g., as illustrated for a sub-frame 406, represented as a dashed block). For example, if the RF band is initially in-use, a TRP may wait until the RF band is idle to send the CTS.

Resource Requirement Signaling

Figure 5:
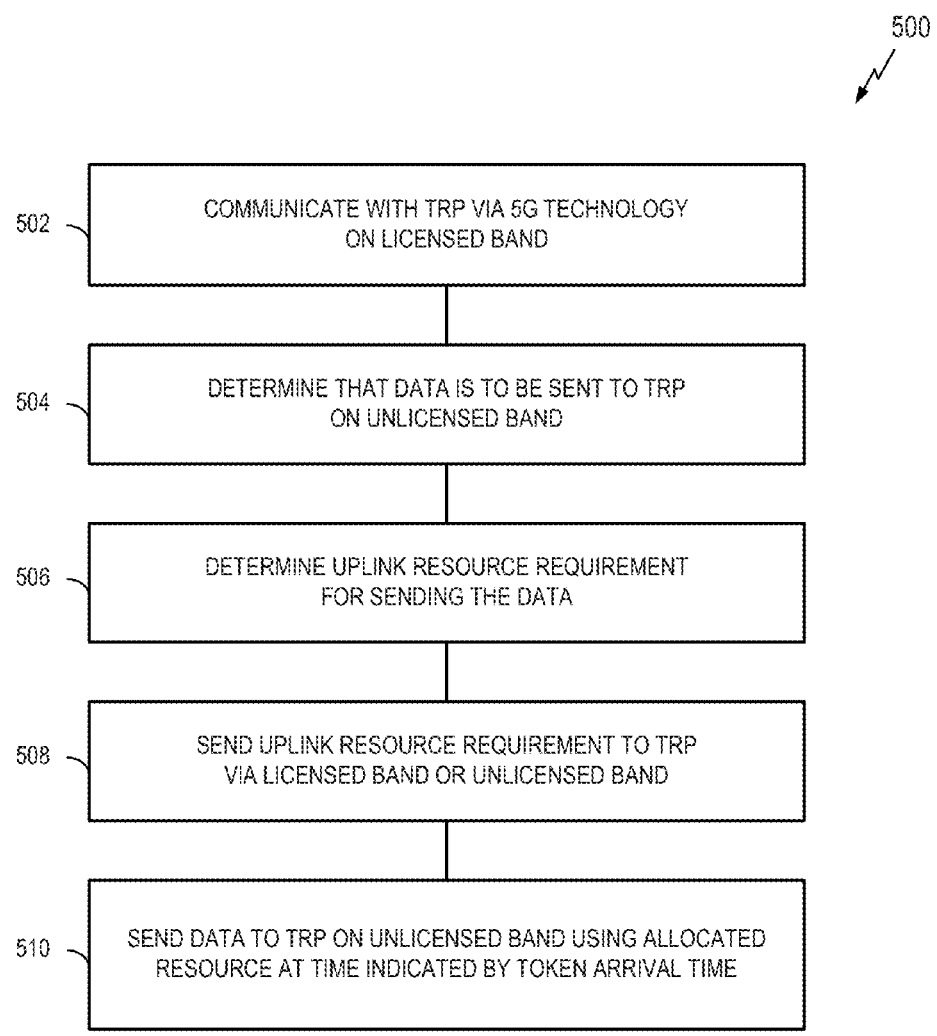
FIG. 5 is a flow diagram illustrating an example of a resource requirement signaling process in accordance with some aspects of the disclosure.

FIG. 5 illustrates a process 500 for resource requirement signaling in accordance with some aspects of the disclosure. The process 500 may take place, at least in part, within a processing circuit (e.g., the processing circuit 1410 of FIG. 14), which may be located in a UE, an access terminal, a TRP, a base station, or some other suitable apparatus. In some implementations, the process 500 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 500 may be implemented by any suitable apparatus capable of supporting resource requirement signaling-related operations.

At block 502, an apparatus (e.g., a UE) communicates with a TRP via 5G technology on a licensed band. For example, a user of the UE may be a subscriber of a network that includes the TRP.

At block 504, the apparatus determines that data is to be sent to the TRP on an unlicensed band. For example, the UE may determine that additional resources, above and beyond the currently available 5G resources (e.g., the currently scheduled resources) are needed for sending data to the TRP.

At block 506, the apparatus determines an uplink resource requirement for sending the data. For example, the UE may determine at least one of: a buffer status, a data rate, a time requirement, or any combination thereof. As another example, the UE may determine that a particular quantity of time-frequency resources is needed to send the data.

At block 508, the apparatus sends the uplink resource requirement to the TRP. In some scenarios, the UE sends an indication of the uplink resource requirement via the licensed band. In some scenarios, the UE sends an indication of the uplink resource requirement via an unlicensed band (e.g., a Wi-Fi band).

At block 510, the apparatus sends the data to the TRP on the unlicensed band. For example, the UE may use a resource allocated by the TRP to send the data. Also, the UE may send the data at a time indicated by a token arrival time.

Figure 6:
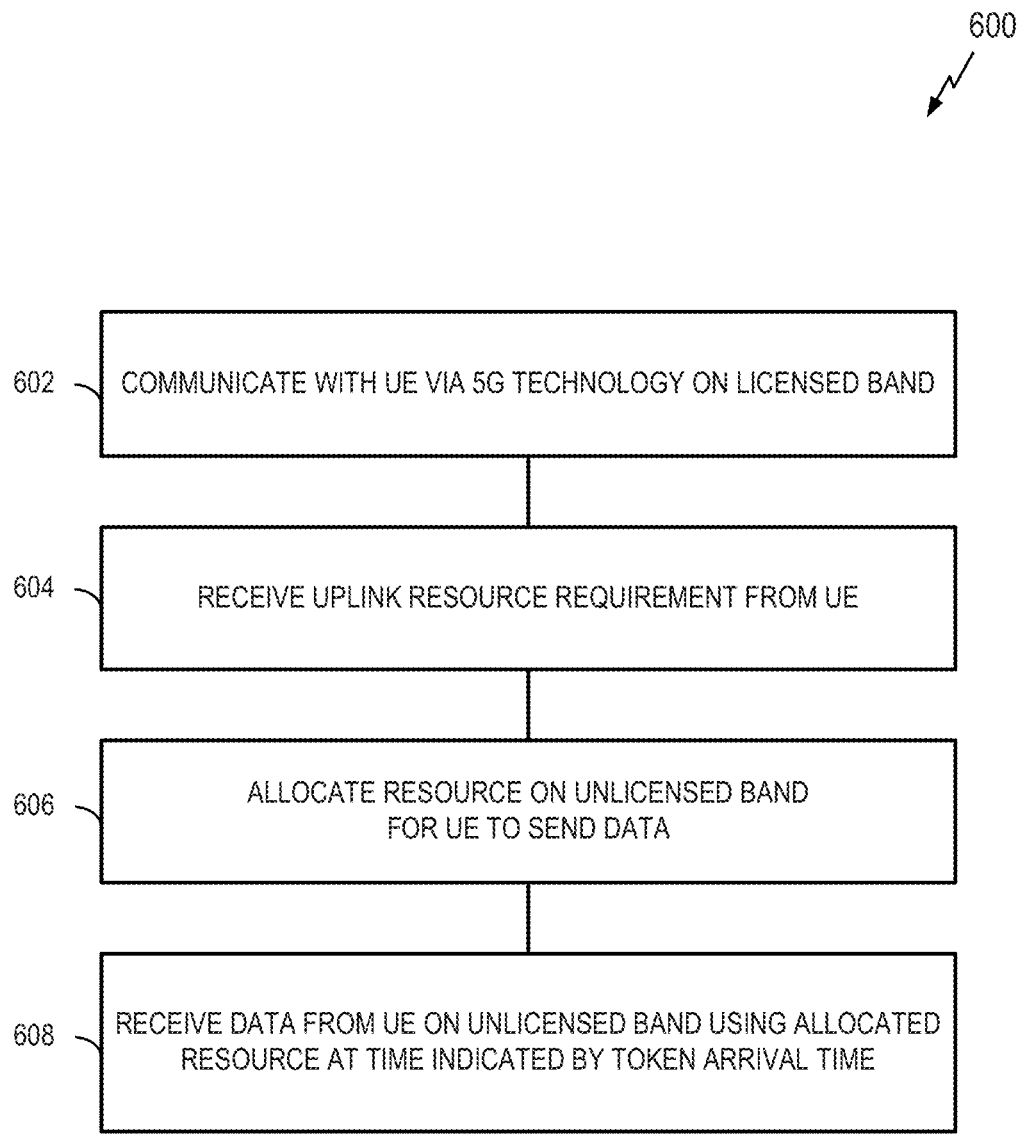
FIG. 6 is a flow diagram illustrating an example of another resource requirement signaling process in accordance with some aspects of the disclosure.

FIG. 6 illustrates another process 600 for resource requirement signaling in accordance with some aspects of the disclosure. In some aspects, the process 600 may be complementary to the process 500 of FIG. 5. For example, the process 600 may be performed in response to or in conjunction with the process 500. The process 600 may take place, at least in part, within a processing circuit (e.g., the processing circuit 2110 of FIG. 21 or the processing circuit 2610 of FIG. 26), which may be located in a TRP, a base station, an access terminal, or some other suitable apparatus. In some implementations, the process 600 represents operations performed, at least in part, by the TRP 102 of FIG. 1 or the TRP 201 of FIG. 2. Of course, in various aspects within the scope of the disclosure, the process 600 may be implemented by any suitable apparatus capable of supporting resource requirement signaling-related operations.

At block 602, a TRP communicates with a UE via 5G technology on a licensed band. For example, a user of the UE may be a subscriber of a network that includes the TRP.

At block 604, the TRP receives the uplink resource requirement from the UE. For example, the TRP may receive the uplink resource requirement sent at block 508 of FIG. 5.

At block 606, the TRP allocates a resource on the unlicensed band for the UE to send the data. For example, the TRP may allocate certain timeslots for the UE on a Wi-Fi band At block 608, the TRP receives the data from the UE on the unlicensed band. The data may be received using the resource allocated at block 606. In addition, the data may be received at a time indicated by a token arrival time.

Rate Setting

Figure 7:
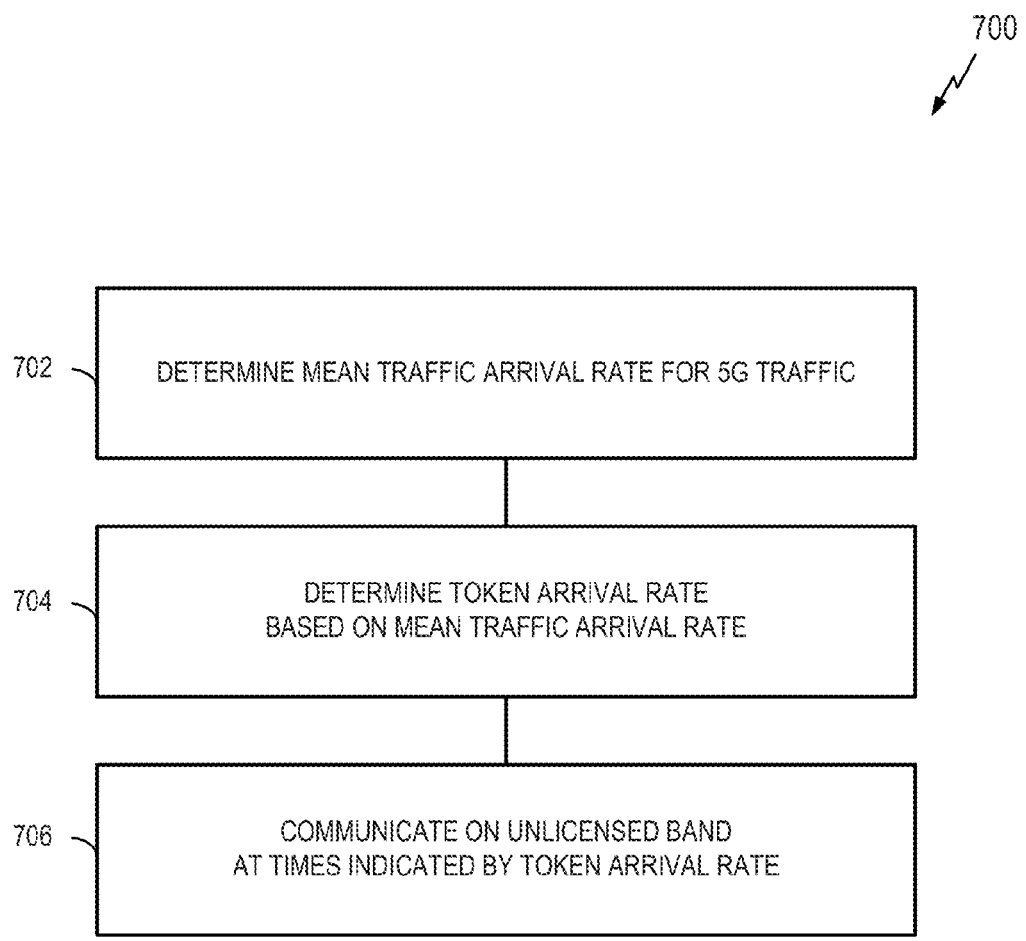
FIG. 7 is a flow diagram illustrating an example of a token bucket-based communication process in accordance with some aspects of the disclosure.

FIG. 7 illustrates a process 700 for rate setting in accordance with some aspects of the disclosure. The process 700 may take place within a processing circuit (e.g., the processing circuit 2110 of FIG. 21), which may be located in a TRP, a base station, an access terminal, or some other suitable apparatus. In some implementations, the process 700 represents operations performed, at least in part, by the TRP 102 of FIG. 1 or the TRP 201 of FIG. 2. Of course, in various aspects within the scope of the disclosure, the process 700 may be implemented by any suitable apparatus capable of supporting rate setting-related operations.

At block 702, an apparatus (e.g., a TRP) determines a mean traffic arrival rate for 5G traffic. For example, the TRP may monitor the amount of traffic (e.g., uplink traffic and/or downlink traffic) seen over a period of time and/or estimate the amount of traffic expected over a period of time (e.g., based on scheduling).

At block 704, the apparatus determines a token arrival rate based on (e.g., as a function of) the mean traffic arrival rate determined at block 702. For example, the TRP may set the token arrival rate to be higher than the mean traffic arrival rate.

At block 706, the apparatus communicates on an unlicensed band at times indicated by the token arrival rate. For example, the TRP may monitor for traffic from a particular UE whenever a corresponding token is added to the token bucket.

Figure 8:
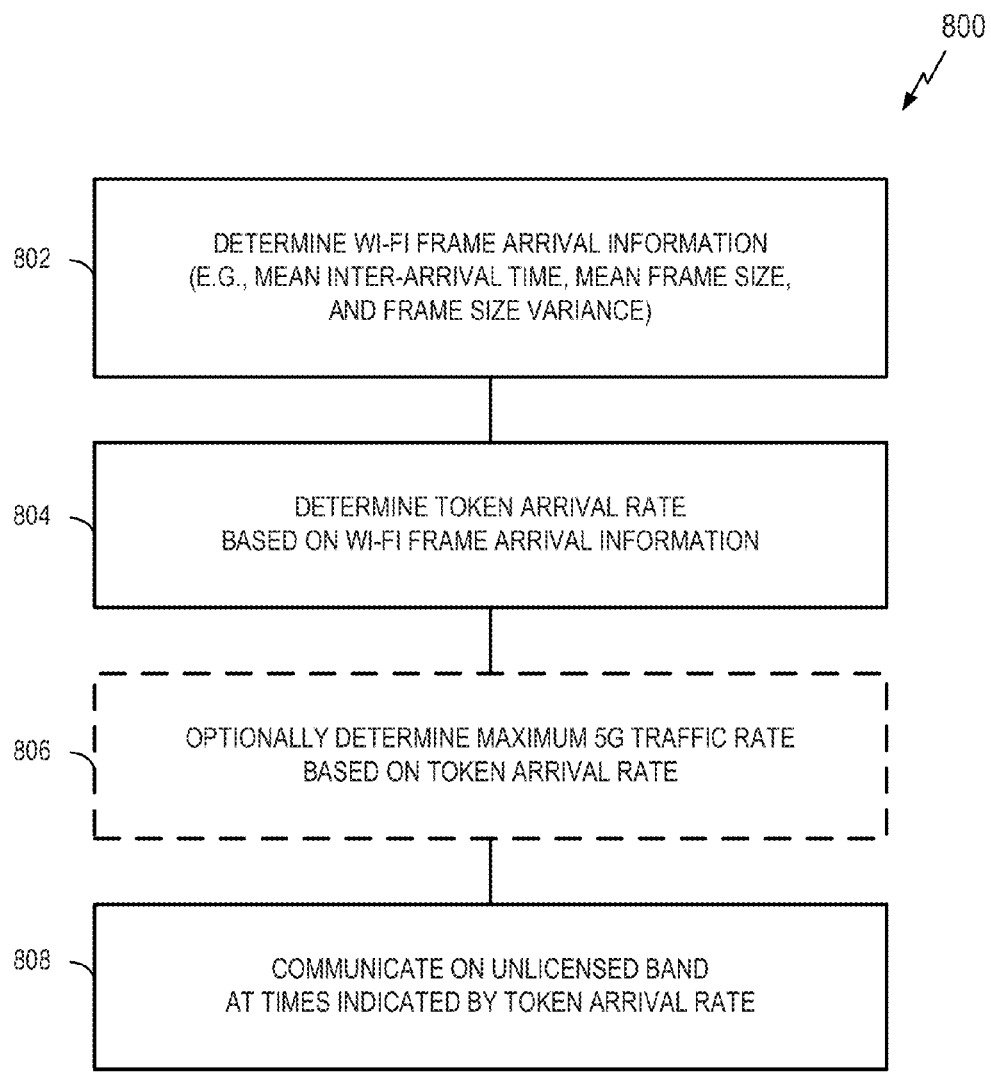
FIG. 8 is a flow diagram illustrating an example of another token bucket-based communication process in accordance with some aspects of the disclosure.

FIG. 8 illustrates another process 800 for rate setting in accordance with some aspects of the disclosure. In some aspects, the process 800 may be complementary to the process 700 of FIG. 7. For example, the process 800 may be performed in conjunction with the process 700. The process 800 may take place within a processing circuit (e.g., the processing circuit 2610 of FIG. 26), which may be located in a TRP, a base station, an access terminal, or some other suitable apparatus. In some implementations, the process 800 represents operations performed, at least in part, by the TRP 102 of FIG. 1 or the TRP 201 of FIG. 2. Of course, in various aspects within the scope of the disclosure, the process 800 may be implemented by any suitable apparatus capable of supporting rate setting-related operations.

At block 802, an apparatus (e.g., a TRP) determines Wi-Fi frame arrival information. For example, the TRP may monitor Wi-Fi traffic and determine a mean inter-arrival time, a mean frame size, and a frame size variance for the Wi-Fi traffic.

At block 804, the apparatus determines a token arrival rate based on the Wi-Fi frame arrival information determined at block 802. For example, the TRP may determine the optimal token arrival rate given a particular Wi-Fi frame arrival rate to ensure that Wi-Fi traffic latency is below a threshold as discussed below in conjunction with FIGS. 12 and 13.

At optional block 806, the apparatus may determine a maximum 5G traffic rate based on the token arrival rate determined at block 804. For example, the TRP may set the 5G traffic arrival rate to be lower than the token rate.

At block 808, the apparatus communicates on an unlicensed band at times indicated by the token arrival rate. For example, the TRP may monitor for traffic from a particular UE whenever a corresponding token is added to the token bucket.

Example Communication of Uplink Resource Requirement

An example signaling scheme for communicating an uplink resource requirement follows. If a UE has a licensed band 5G operation concurrent with the unlicensed band, then the UE may send resource requests using uplink control channels in the licensed band. Alternatively, in the absence of a licensed band, the UE may use an Institute of Electrical and Electronics Engineers (IEEE) 802.11 null data packet (NDP) frame for the communication of uplink resources.

Figure 9:
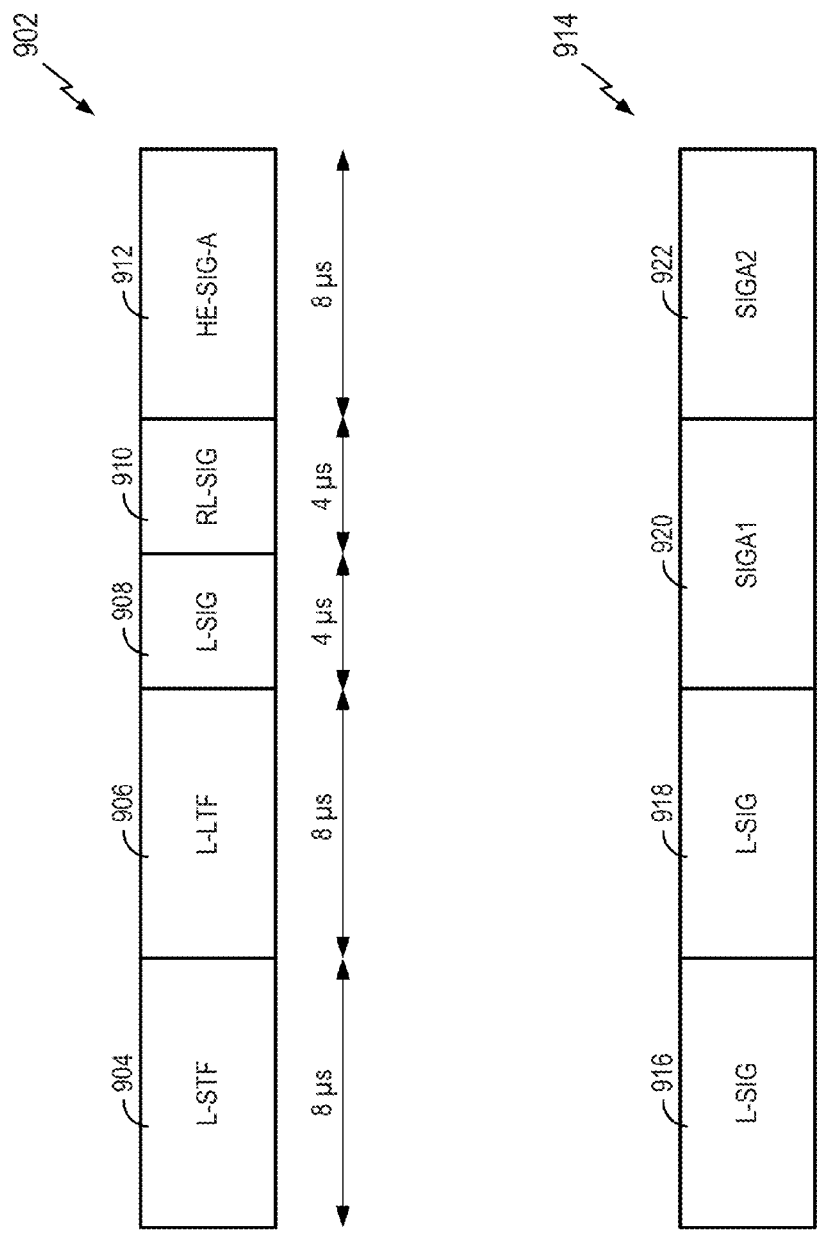
FIG. 9 is a diagram illustrating examples of null data packet (NDP) formats in accordance with some aspects of the disclosure.

FIG. 9 illustrates examples frame structures of an IEEE 802.11 NDP. A first structure 902 includes a legacy short training field (L-STF) field 904, a legacy long training field (L-LTF) field 906, a legacy signal (L-SIG) field 908, a repetition legacy signal (RL-SIG) field 910, and a high efficiency signal (HE-SIG-A) field 912. Example timing of each field is shown. Different implementations may use different timing values. The structure 902 may correspond to an IEEE 802.11ax preamble. Uplink resource requirement information may be carried in the HE-SIG-A field 912 (e.g., which may carry 46 bits in some implementations).

A second structure 914 includes L-SIG fields (repeated twice) as an L-SIG field 916 and an L-SIG field 918, where each L-SIG field contains a representation of the length of the entire frame. A SIGA1 field 920 and a SIGA2 field 922 carry 52 bits that have a defined functionality. These 52 bits can include 42 signaling bits, 4 cyclic redundancy check (CRC) bits, and 6 tail bits. The suffixes A1 and A2 in SIGA1 and SIGA2, respectively, indicate different SIG fields.

Table 1 illustrates an example format for an NDP-based resource request message. The format of the NDP is reused since it is a frame that Wi-Fi (e.g., IEEE 802.11) devices will detect and defer to. The bits of SIGA1 and SIGA2 are reconfigured as follows: 2 bits are used as a type indicator, 4 bits are used for carrying the UE quantized resource requirement, 20 bits are used to carry a UE+TRP identifier (a hash of the UE identifier may be concatenated with TRP identifier), 16 bits may be reserved (e.g., to be purposed later), and 4 bits may be used for an error check sequence (e.g., CRC bits).

TABLE 1

FORMAT FOR NDP FOR UPLINK RESOURCE REQUEST

| | |
|---|---|
| 2 BITS | TYPE INDICATOR |
| 20 BITS | UE ∥ TRP HASH AS IDENTIFIER |
| 4 BITS | RESOURCE REQUIREMENT |
| 16 BITS | RESERVED |
| 4 BITS | CRC |
| 6 BITS | TAIL |

The resource requirement may be represented in various ways. In some scenarios, a number of bits may represent the current buffer status (e.g., a quantization of the number of bits in the buffer). This representation may be linear or non-linear. In some scenarios, a number of bits may represent the current data rate or indicate that the data rate has changed. In this case, the bits may be, for example, a quantization of data rate. In some scenarios, a number of bits may represent a time requirement (e.g., the number of sub-frames per allocation).

The CRC bits may be modified so that Wi-Fi devices that are not using the unlicensed band for 5G traffic as taught herein may ignore the NDP. For example, the CRC may initially be calculated as it is in the case of IEEE 802.11 NDP, and the calculated bits are modified. For example, the bits may be inverted, a value (e.g., a value of 1) may be added to the bits, or the bits may be modified in some other way. In this way, the CRC would not "check" at an IEEE 802.11 device that does not support unlicensed band communication as taught herein, but would allow 5G devices that support unlicensed band communication as taught herein to verify that the message is accurate. NDP messages generated by IEEE 802.11 devices may be ignored at the 5G device.

The resource request message is sent by contention by the UE. This message may be sent at any time between possible accesses by the TRP.

The TRP may acknowledge the message. For example, the TRP may simply repeat the message back to the sending UE within a fixed time of receiving the message.

First Example Token Rate Setting Algorithm

Figure 10:
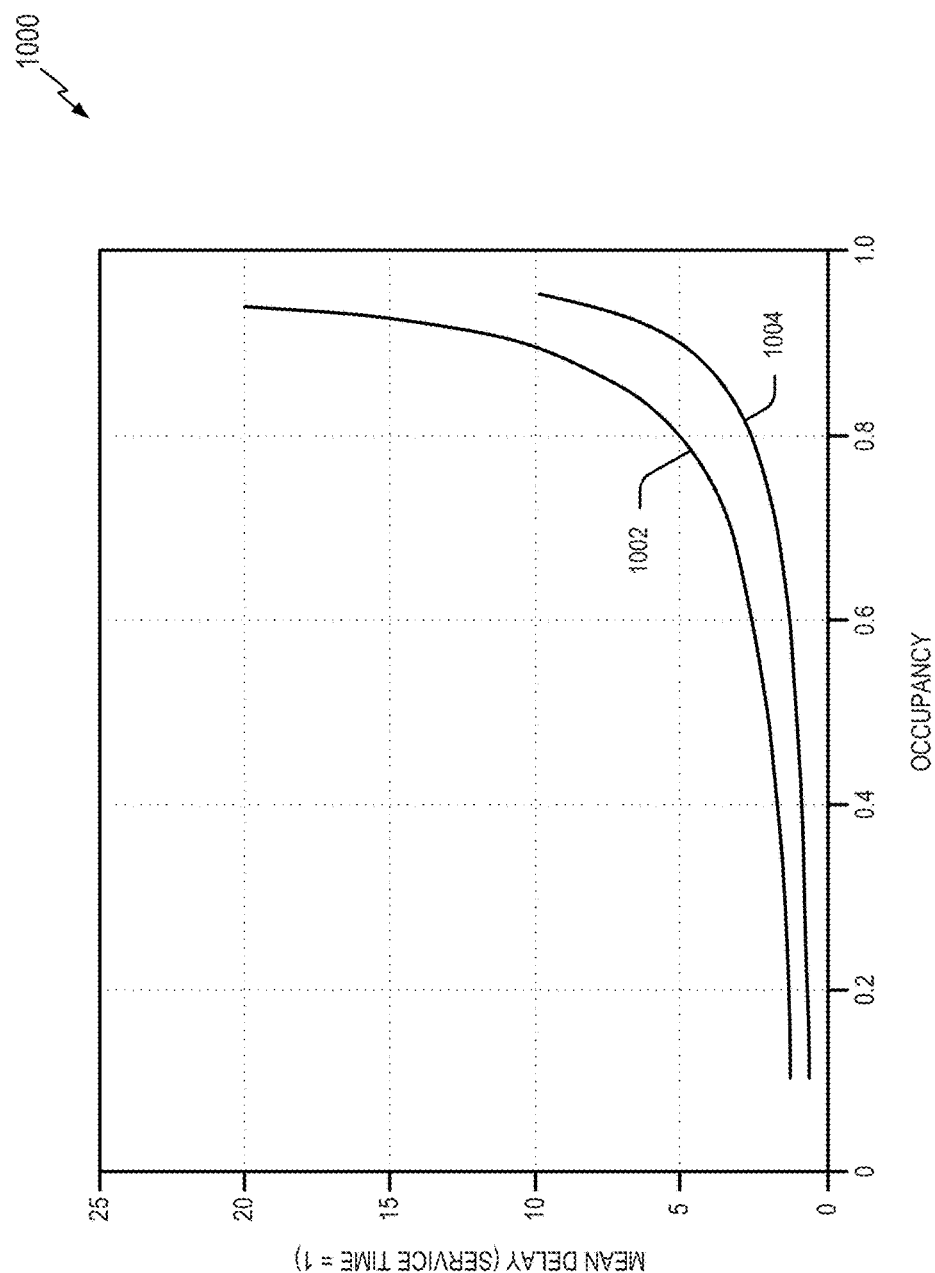
FIG. 10 is a chart illustrating an example of traffic delay in accordance with some aspects of the disclosure.

An example algorithm for setting a token rate for 5G traffic follows. This example uses an M/D/1 queue-based heuristic. See FIG. 10 which illustrates mean delay 1002 as a function of occupancy for an M/M/1 queue and mean delay 1004 as a function of occupancy for an M/D/1 queue. It is assumed that the inter-arrival times and frame sizes are exponentially distributed. This model of the arrival process may be accurate if it is an aggregate of a large number of sources. The packet sizes are more likely fixed; therefore, the M/D/1 assumption is reasonable.

An example heuristic may be defined as follows: token arrival rate>1.1*mean traffic arrival rate. Here, traffic arrival rate is normalized to token size (e.g., tokens/second). Thus, the token arrival rate (e.g., the number of tokens/second) may be 1.1*the traffic arrival rate expressed in terms of the "amount of traffic" that can be served by one token.

Second Example Token Rate Setting Algorithm

An example algorithm for setting a token rate to accommodate (e.g., provide fairness for) Wi-Fi traffic follows. In some aspects, an objective here may be to obtain a maximum token arrival rate that ensures "limited" latency impact on Wi-Fi traffic.

Figure 11:
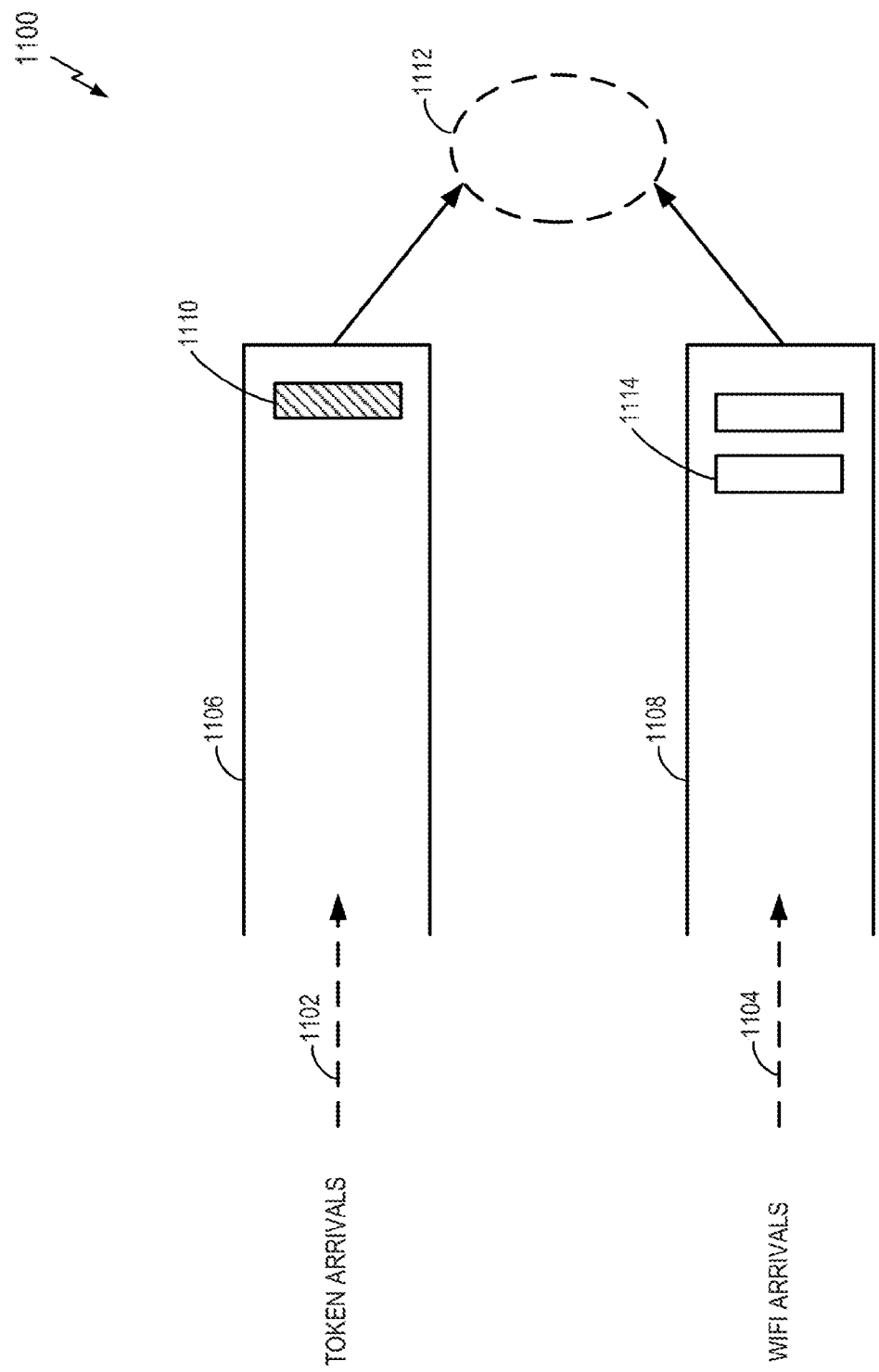
FIG. 11 is a diagram illustrating an example of traffic arrival in accordance with some aspects of the disclosure.

Example traffic arrivals 1102 and Wi-Fi arrivals 1104 in respective queues 1106 and 1108 are shown in FIG. 11. Each token 1110 may be considered as an arrival that has "non-preemptive" priority on the communication medium 1112. A token would take up air time immediately if the medium is free. If the medium is not free, then the token takes up air time immediately after a Wi-Fi frame (e.g., a frame 1114) is complete.

Figure 12:
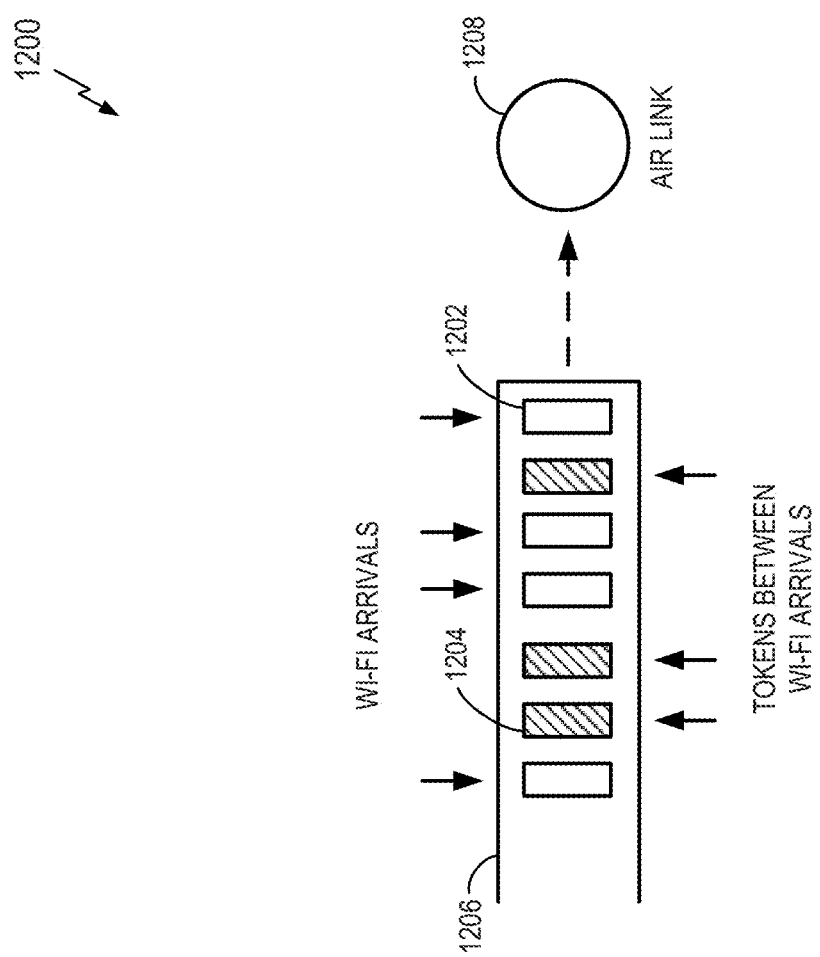
FIG. 12 is a diagram illustrating an abstract example of traffic arrival in accordance with some aspects of the disclosure.
Figure 13:
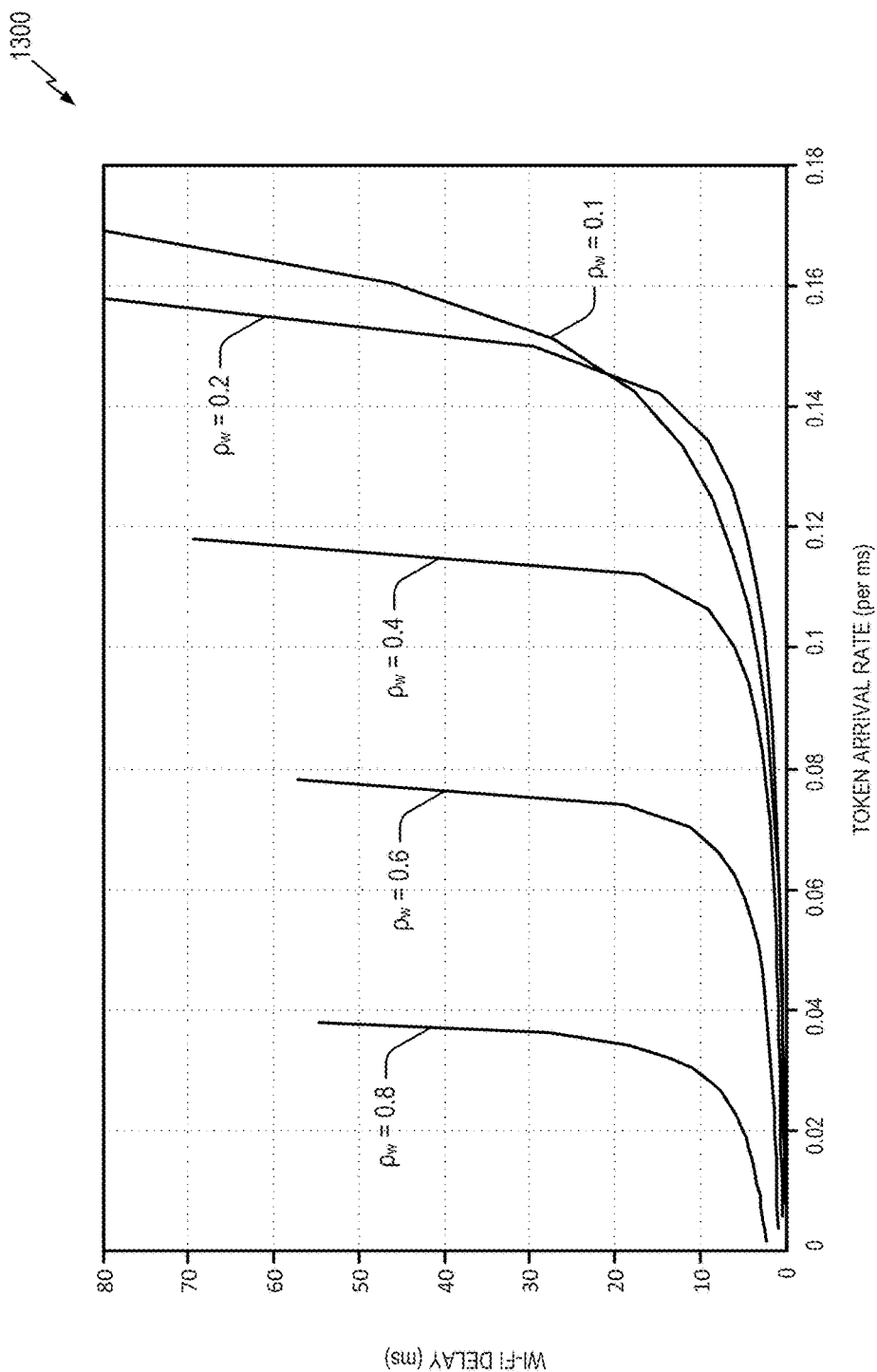
FIG. 13 is a chart illustrating another example of traffic delay in accordance with some aspects of the disclosure.

The disclosure relates in some aspects to determining the optimal token arrival rate given a Wi-Fi frame arrival rate to ensure that Wi-Fi traffic latency is below a threshold. Referring to FIGS. 12 and 13, an approximation for the delay of Wi-Fi will be presented. FIG. 12 is an abstraction 1200 of Wi-Fi arrivals (e.g., a packet 1202) and token arrivals (e.g., a token 1204) in a queue 1206 for an air link 1208. FIG. 13 is a chart 1300 that illustrates Wi-Fi delay as a function of token arrival rate for various occupancy levels ($\rho_w$=0.1, 0.2, etc.).

The service time for each Wi-Fi packet is approximated as the sum of the Wi-Fi packet transmit time and the service time to serve the tokens that arrive in between the Wi-Fi packet and the Wi-Fi packet that precedes it. The service time of each Wi-Fi frame is a function of the inter arrival rate of Wi-Fi. A lower inter-arrival time of Wi-Fi increases the service time of the Wi-Fi frame.

The Pollaczek-Khinchine (PK) formula for an M/G/1 queue may be used to compute the mean waiting time for the Wi-Fi frame. An example of an algorithm for deriving the Wi-Fi delay follows.

The mean waiting time E(W) for the Wi-Fi packets from the PK formulation of an M/G/1 queue may be represented as set forth in Equation 1.

$$E(W) = \frac{1+C_v^2}{2} \frac{\rho}{(1-\rho)} \quad \text{EQUATION 1}$$

In Equation 1, $C_v^2$ may represent the coefficient of variation of the effective service process of the queue and $\rho$ may thus represent the occupancy of the queue.

To compute $\rho$, the inter arrival time of Wi-Fi $1/\lambda_w$ and the effective service time to serve a Wi-Fi frame may be computed as the sum of: 1) the time taken to transmit the Wi-Fi frame: mean—$\tau_w$, variance $\sigma_w^2$ and 2) the time taken to serve the tokens that arrive in the interval preceding the Wi-Fi arrival.

The time taken to serve the tokens may be computed as follows. Let $\lambda_T$ denote the constant token arrival rate, and $\tau_T$ denote the time occupied by one traffic that consumes one token. The mean number of tokens that arrive in an interval between Wi-Fi arrivals may be $\lambda_T/\lambda_w$, the variance of the number of tokens may be $$\left(\frac{\lambda_T}{\lambda_w}\right)^2$$

since the Wi-Fi arrivals may be assumed to be Poisson. Hence the mean time taken to serve the tokens between arrivals may be $$\left(\frac{\lambda_T}{\lambda_w}\right)\tau_T$$

and the variance of time taken to serve the tokens $$\left(\frac{\lambda_T}{\lambda_w}\right)^2 \tau_T^2.$$

Let S denote the effective service time of the Wi-Fi packets:

$$E(S) = \tau_w + \left(\frac{\lambda_T}{\lambda_w}\right)\tau_T \quad \text{EQUATION 2}$$

$$\text{Var}(S) = \sigma_w^2 + \left(\frac{\lambda_T}{\lambda_w}\right)^2 \tau_T^2$$

$$\rho = \lambda_w E(S)$$

$$C_v^2 = \frac{\text{Var}(S)}{E(S)^2} = \frac{\sigma_w^2 + \left(\frac{\lambda_T}{\lambda_w}\right)^2 \tau_T^2}{\left(\tau_w + \left(\frac{\lambda_T}{\lambda_w}\right)\tau_T\right)^2}$$

E(W) can be plotted as a function of $\lambda_w$ subject to keeping $\rho<1$.

The plot of FIG. 13 shows the Wi-Fi latency as a function of the token rate for different Wi-Fi occupancy. For this example, it is assumed that the Wi-Fi frame has a fixed size of 3 ms and that a given token permits 5 milliseconds (ms) of 5G traffic.

A random service time for Wi-Fi also could be assumed. As one example, it may be assumed that the Wi-Fi frame size has a geometric distribution (e.g., mean 3 ms, variance 6). In addition, it may be assumed that each token allows for a fixed 5 ms access.

In this case, the distribution of the Wi-Fi frame size has a relatively small impact on the mean delay with the token based method. At low occupancy Wi-Fi, the contribution of the variance of the number of tokens between Wi-Fi frames is a dominating factor in the delay. At high occupancy Wi-Fi, the variance of the Wi-Fi frame size dominates; however, the delay is more a function of the occupancy.

In view of the above, setting a token rate may involve the following operations. The token rate for the 5G stream may be computed based on measured Wi-Fi traffic. This may involve obtaining the mean inter arrival time and mean and variance of the Wi-Fi frame size. Tables can be constructed based on the M/G/1 approximation to determine the maximum token rate that can be used for 5G traffic.

Also, the following admission control may be used for 5G. In one example scenario, the 5G traffic arrival rate is selected to be no larger than 0.9*the token rate. Once the maximum token rate has been computed based on Wi-Fi traffic, the 5G traffic may be throttled to not exceed the token rate.

First Example Apparatus

Figure 14:
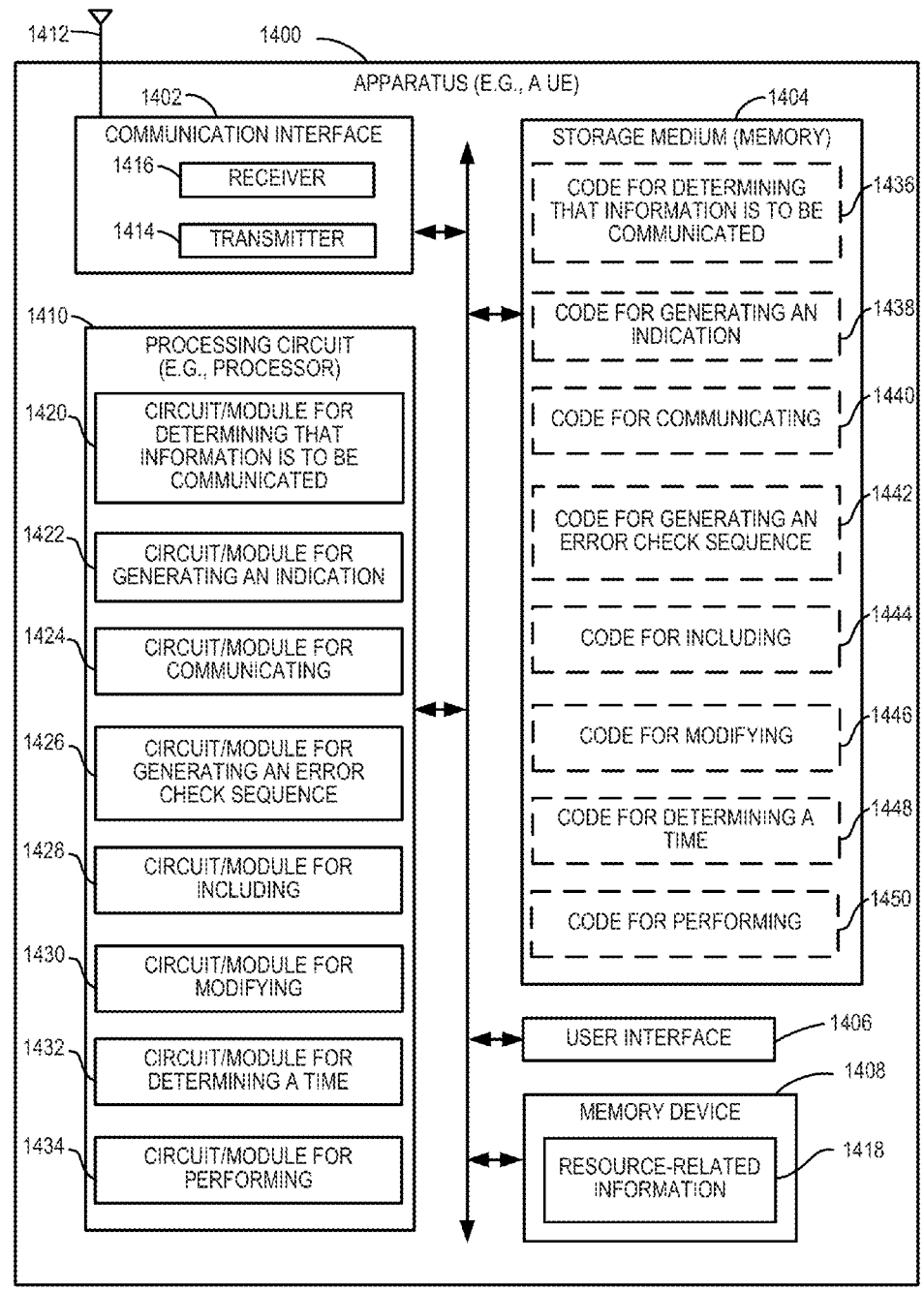
FIG. 14 is a block diagram illustrating an example hardware implementation for an apparatus (e.g., an electronic device) that can support a resource requirement signaling scheme in accordance with some aspects of the disclosure.

FIG. 14 is an illustration of an apparatus 1400 that may support resource requirement signaling according to one or more aspects of the disclosure. The apparatus 1400 could embody or be implemented within a UE, an access point, or some other type of device that supports wireless communication. In various implementations, the apparatus 1400 could embody or be implemented within an access terminal, an access point, or some other type of device. In various implementations, the apparatus 1400 could embody or be implemented within a mobile phone, a smart phone, a tablet, a portable computer, a server, a personal computer, a sensor, an entertainment device, a medical device, or any other electronic device having circuitry.

The apparatus 1400 includes a communication interface 1402 (e.g., at least one transceiver), a storage medium 1404, a user interface 1406, a memory device 1408, and a processing circuit 1410 (e.g., a processor). These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 may be adapted to facilitate wireless communication of the apparatus 1400. For example, the communication interface 1402 may include circuitry and/or programming adapted to facilitate the communication of information bi-directionally with respect to one or more communication devices in a network. In some implementations, the communication interface 1402 may be configured for wire-based communication. In some implementations, the communication interface 1402 may be coupled to one or more antennas 1412 for wireless communication within a wireless communication system. The communication interface 1402 can be configured with one or more standalone receivers and/or transmitters, as well as one or more transceivers. In the illustrated example, the communication interface 1402 includes a transmitter 1414 and a receiver 1416.

The memory device 1408 may represent one or more memory devices. As indicated, the memory device 1408 may maintain resource-related information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-5, 9, and 15-20. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-5, 9, and 15-20. The processing circuit 1410 may serve as one example of a means for transmitting and/or a means for receiving. In various implementations, the processing circuit 1410 may incorporate the functionality of the UE 104 of FIG. 1, the wireless communication node 216 or 222 of FIG. 2, or the IoE device 236 or 242 of FIG. 2.

According to at least one example of the apparatus 1400, the processing circuit 1410 may include one or more of a circuit/module for determining that information is to be communicated 1420, a circuit/module for generating an indication 1422, a circuit/module for communicating 1424, a circuit/module for generating an error check sequence 1426, a circuit/module for including 1428, a circuit/module for modifying 1430, a circuit/module for determining a time 1432, or a circuit/module for performing 1434. In various implementations, the circuit/module for determining that information is to be communicated 1420, the circuit/module for generating an indication 1422, the circuit/module for communicating 1424, the circuit/module for generating an error check sequence 1426, the circuit/module for including 1428, the circuit/module for modifying 1430, the circuit/module for determining a time 1432, or the circuit/module for performing 1434 may correspond, at least in part, to the functionality of the UE 104 of FIG. 1, the wireless communication node 216 or 222 of FIG. 2, or the IoE device 236 or 242 of FIG. 2.

As mentioned above, programming stored by the storage medium 1404, when executed by the processing circuit 1410, causes the processing circuit 1410 to perform one or more of the various functions and/or process operations described herein. For example, the programming, when executed by the processing circuit 1410, may cause the processing circuit 1410 to perform the various functions, steps, and/or processes described herein with respect to FIGS. 1-5, 9, and 15-20 in various implementations. As shown in FIG. 14, the storage medium 1404 may include one or more of code for determining that information is to be communicated 1436, code for generating an indication 1438, code for communicating 1440, code for generating an error check sequence 1442, code for including 1444, code for modifying 1446, code for determining a time 1448, or code for performing 1450. In various implementations, the code for determining that information is to be communicated 1436, the code for generating an indication 1438, the code for communicating 1440, the code for generating an error check sequence 1442, the code for including 1444, the code for modifying 1446, the code for determining a time 1448, or the code for performing 1450 may be executed or otherwise used to provide the functionality described herein for the circuit/module for determining that information is to be communicated 1420, the circuit/module for generating an indication 1422, the circuit/module for communicating 1424, the circuit/module for generating an error check sequence 1426, the circuit/module for including 1428, the circuit/module for modifying 1430, the circuit/module for determining a time 1432, or the circuit/module for performing 1434.

The circuit/module for determining that information is to be communicated 1420 may include circuitry and/or programming (e.g., code for determining that information is to be communicated 1436 stored on the storage medium 1404) adapted to perform several functions relating to, for example, determining that information is to be communicated via an unlicensed RF band. In some implementations, the circuit/module for determining that information is to be communicated 1420 obtains an indication (e.g., from the circuit/module for communicating 1424, the memory device 1408, the communication interface 1402, or some other component) that uplink information or other information needs to be sent. The circuit/module for determining that information is to be communicated 1420 may then obtain an indication (e.g., from the circuit/module for communicating 1424, the memory device 1408, the communication interface 1402, the receiver 1416, or some other component) regarding the available resources on a licensed band. Based on this information, the circuit/module for determining that information is to be communicated 1420 determines whether the resources on the licensed band are adequate for communicating the information (e.g., meets a quality of service requirement). If not, the circuit/module for determining that information is to be communicated 1420 outputs an indication that information is to be communicated via an unlicensed RF band (e.g., to the circuit/module for generating an indication 1422, the circuit/module for communicating 1424, the memory device 1408, the communication interface 1402, or some other component).

The circuit/module for generating an indication 1422 may include circuitry and/or programming (e.g., code for generating an indication 1438 stored on the storage medium 1404) adapted to perform several functions relating to, for example, generating an indication of a resource requirement for communication of the information via the unlicensed RF band. In some implementations, the circuit/module for generating an indication 1422 determines how many resources are needed for uplink or other communication (e.g., based on information from the circuit/module for determining that information is to be communicated 1420, the circuit/module for communicating 1424, the memory device 1408, the communication interface 1402, the receiver 1416, or some other component). For example, the circuit/module for generating an indication 1422 may determine at least one of: a buffer status, a data rate, a time requirement, or any combination thereof. The circuit/module for generating an indication 1422 may then derive an indication representative of the resources. For example, the circuit/module for generating an indication 1422 may quantize the resource information or generate some other form of representation. The circuit/module for generating an indication 1422 then outputs the indication (e.g., to the circuit/module for communicating 1424, the memory device 1408, the communication interface 1402, the transmitter 1414, or some other component).

The circuit/module for communicating 1424 may include circuitry and/or programming (e.g., code for communicating 1440 stored on the storage medium 1404) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1424 may send an indication to an entity that schedules at least one resource (e.g., on an unlicensed RF band for communication of information). In some aspects, the circuit/module for communicating 1424 may send information over an unlicensed RF band (e.g., at a time that is based on a token arrival time). In some aspects, the circuit/module for communicating 1424 may send an NDP frame (e.g., after a clear channel assessment and contention is performed).

In some implementations where the communicating involves receiving information, the circuit/module for communicating 1424 receives information (e.g., from the communication interface 1402, the receiver 1416, the memory device 1408, some other component of the apparatus 1400, or some other device), processes (e.g., decodes) the information, and outputs the information to another component of the apparatus 1400 (e.g., the memory device 1408 or some other component). In some scenarios (e.g., if the circuit/module for communicating 1424 includes a receiver), the communicating involves the circuit/module for communicating 1424 receiving information directly from a device that transmitted the information (e.g., via radio frequency signaling or some other type of signaling suitable for the applicable communication medium).

In some implementations where the communicating involves sending information, the circuit/module for communicating 1424 obtains information (e.g., from the circuit/module for generating an indication 1422, the circuit/module for determining that information is to be communicated 1420, the memory device 1408, or some other component of the apparatus 1400), processes (e.g., encodes) the information, and outputs the processed information. In some scenarios, the communicating involves sending the information to another component of the apparatus 1400 (e.g., the transmitter 1414, the communication interface 1402, or some other component) that will transmit the information to another device. In some scenarios (e.g., if the circuit/module for communicating 1424 includes a transmitter), the communicating involves the circuit/module for communicating 1424 transmitting the information directly to another device (e.g., the ultimate destination) via radio frequency signaling or some other type of signaling suitable for the applicable communication medium.

In some implementations, the circuit/module for communicating 1424 is a transceiver. In some implementations, the circuit/module for communicating 1424 is a receiver. In some implementations, the circuit/module for communicating 1424 is a transmitter. In some implementations, the communication interface 1402 includes the circuit/module for communicating 1424 and/or the code for communicating 1440. In some implementations, the circuit/module for communicating 1424 and/or the code for communicating 1440 is configured to control the communication interface 1402 (e.g., a transceiver, a receiver, or a transmitter) to communicate the information.

The circuit/module for generating an error check sequence 1426 may include circuitry and/or programming (e.g., code for generating an error check sequence 1442 stored on the storage medium 1404) adapted to perform several functions relating to, for example, generating an error check sequence for an indication (e.g., an indication of a resource requirement). In some implementations, the circuit/module for generating an error check sequence 1426 obtains the indication (e.g., from the circuit/module for generating an indication 1422, the circuit/module for communicating 1424, the memory device 1408, the communication interface 1402, the receiver 1416, or some other component). The circuit/module for generating an error check sequence 1426 then applies an algorithm (e.g., a CRC algorithm) to the indication to obtain an error check sequence (e.g., CRC bits). The circuit/module for generating an error check sequence 1426 then outputs the error check sequence (e.g., to the circuit/module for including 1428, the circuit/module for modifying 1430, the circuit/module for communicating 1424, the memory device 1408, the communication interface 1402, or some other component).

The circuit/module for including 1428 may include circuitry and/or programming (e.g., code for including 1444 stored on the storage medium 1404) adapted to perform several functions relating to, for example, including an error check sequence for an indication in an NDP frame. In some aspects, the error check sequence may be a modified error check sequence. In some aspects, the error check sequence may be CRC bits.

In some implementations, the circuit/module for including 1428 obtains the error check sequence (e.g., from the circuit/module for generating an error check sequence 1426, the circuit/module for communicating 1424, the memory device 1408, the communication interface 1402, or some other component). The circuit/module for including 1428 then formats information (including the indication) for inclusion in a frame. The circuit/module for including 1428 then outputs the frame information (e.g., to the circuit/module for communicating 1424, the memory device 1408, the communication interface 1402, or some other component).

The circuit/module for modifying 1430 may include circuitry and/or programming (e.g., code for modifying 1446 stored on the storage medium 1404) adapted to perform several functions relating to, for example, modifying an error check sequence. In some aspects, the error check sequence may be at least one CRC bit. In some implementations, the circuit/module for modifying 1430 obtains the error check sequence (e.g., from the circuit/module for generating an error check sequence 1426, the circuit/module for communicating 1424, the memory device 1408, the communication interface 1402, or some other component). The circuit/module for modifying 1430 inverts, bit flips, or otherwise modifies the error check sequence. The circuit/module for modifying 1430 then outputs the modified error check sequence (e.g., to the circuit/module for including 1428, the circuit/module for communicating 1424, the memory device 1408, the communication interface 1402, or some other component).

The circuit/module for determining a time 1432 may include circuitry and/or programming (e.g., code for determining a time 1448 stored on the storage medium 1404) adapted to perform several functions relating to, for example, determining a time that is based on a token arrival time. In some implementations, the circuit/module for determining a time 1432 obtain information about a token arrival time (e.g., from token bucket parameters, the circuit/module for communicating 1424, the memory device 1408, the communication interface 1402, or some other component). The circuit/module for determining a time 1432 generates an indication of a particular time corresponding to the token arrival time. The circuit/module for determining a time 1432 then outputs an indication of the time (e.g., to the circuit/module for communicating 1424, the memory device 1408, the communication interface 1402, or some other component).

The circuit/module for performing 1434 may include circuitry and/or programming (e.g., code for performing 1450 stored on the storage medium 1404) adapted to perform several functions relating to, for example, performing clear channel assessment and contention on an unlicensed band. In some implementations, the circuit/module for performing 1434 obtains information about channel conditions (e.g., from the circuit/module for communicating 1424, the receiver 1416, the memory device 1408, the communication interface 1402, or some other component). The circuit/module for performing 1434 analyzes a received contention signal, if applicable, generates contention signals, if needed, and outputs the generated contention signals (e.g., via the circuit/module for communicating 1424, the memory device 1408, the communication interface 1402, or some other component). The circuit/module for performing 1434 then outputs an indication that the assessment and contention operations have completed (e.g., to the circuit/module for communicating 1424, the memory device 1408, the communication interface 1402, or some other component).

First Example Process

Figure 15:
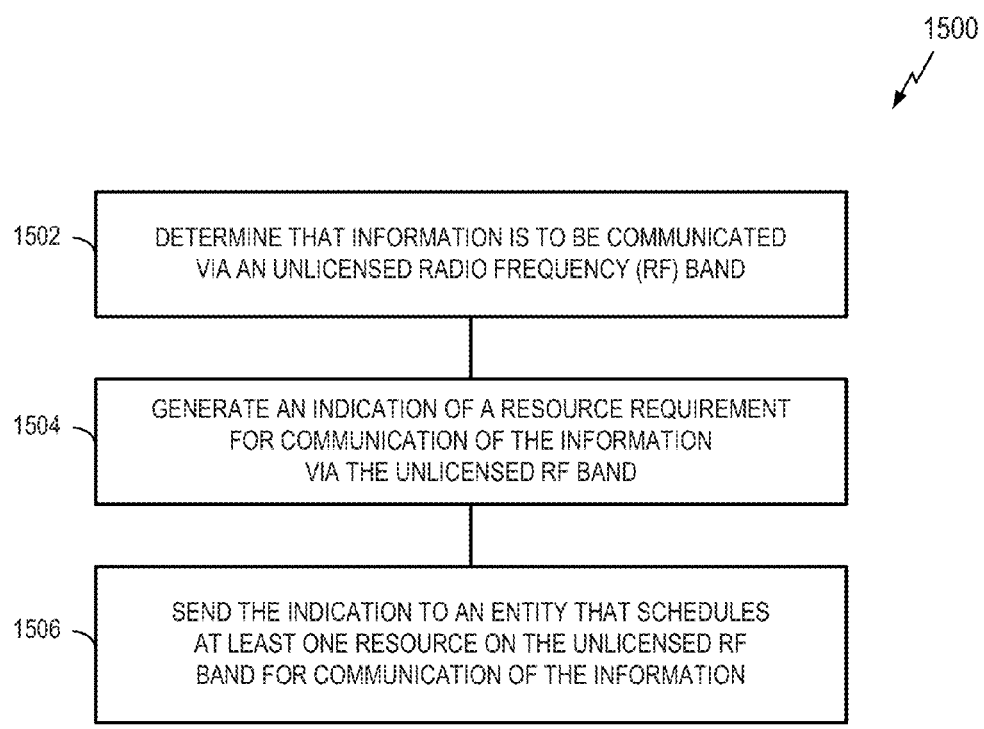
FIG. 15 is a flow diagram illustrating an example of a resource requirement signaling process in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, an access terminal, a TRP, or some other suitable apparatus. In some implementations, the process 1500 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 1500 may be implemented by any suitable apparatus capable of supporting signaling-related operations.

At block 1502, an apparatus (e.g., a UE) determines that information is to be communicated via an unlicensed radio frequency (RF) band. For example, a UE may determine that additional resources, above and beyond the currently available 5G resources (e.g., the currently scheduled resources) are needed for sending data to and/or receiving data from the TRP.

In some implementations, the circuit/module for determining that information is to be communicated 1420 of FIG. 14 performs the operations of block 1502. In some implementations, the code for determining that information is to be communicated 1436 of FIG. 14 is executed to perform the operations of block 1502.

At block 1504, the apparatus generates an indication of a resource requirement for communication of the information via the unlicensed RF band. In some aspects, the resource requirement may include an uplink resource requirement for the unlicensed RF band.

The indication may be generated in different ways in different scenarios. For example, the UE may determine at least one of: a buffer status, a data rate, a time requirement, or any combination thereof. The UE may then generate a corresponding indication (e.g., a quantization or some other representation) based on this information. As another example, the UE may determine that a particular quantity of time-frequency resources is needed to send the data and generate a corresponding indication.

In some implementations, the circuit/module for generating an indication 1422 of FIG. 14 performs the operations of block 1504. In some implementations, the code for generating an indication 1438 of FIG. 14 is executed to perform the operations of block 1504.

At block 1506, the apparatus sends the indication to an entity that schedules at least one resource on the unlicensed RF band for communication of the information. For example, the UE may send the indication to a serving TRP.

The indication may be sent in various ways in different scenarios. In some aspects, the indication may be sent via a licensed RF band. In some aspects, the indication may be sent using 5G technology. In some aspects, the indication may be sent via the unlicensed RF band. In some aspects, the indication may be sent using wireless local area network (WLAN) technology. In some aspects, the indication may be sent using Institute of Electrical and Electronics Engineers (IEEE) 802.11 technology. In some aspects, the indication may be sent via an NDP frame.

In some implementations, the circuit/module for communicating 1424 of FIG. 14 performs the operations of block 1506. In some implementations, the code for communicating 1440 of FIG. 14 is executed to perform the operations of block 1506.

Second Example Process

Figure 16:
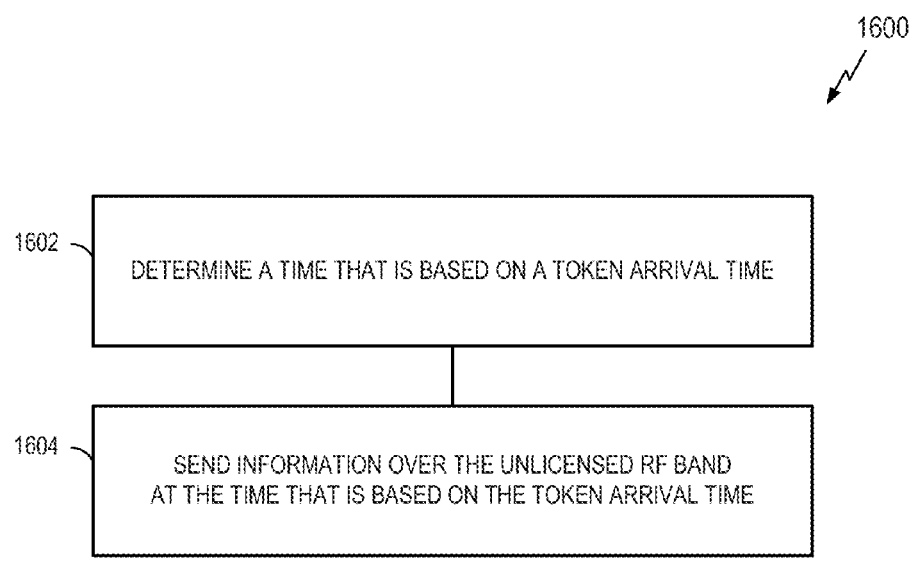
FIG. 16 is a flow diagram illustrating an example of a process for communicating information according to a token arrival time in accordance with some aspects of the disclosure.

FIG. 16 illustrates a process 1600 for communication in accordance with some aspects of the disclosure. In some implementations, the process 1600 may be performed in addition to (e.g., in conjunction with) the process 1500 of FIG. 15. The process 1600 may take place within a processing circuit (e.g., the processing circuit 1410 of FIG. 14), which may be located in a UE, an access terminal, a TRP, or some other suitable apparatus. In some implementations, the process 1600 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 1600 may be implemented by any suitable apparatus capable of supporting signaling-related operations.

At block 1602, an apparatus (e.g., a UE) determines a time that is based on a token arrival time. For example, a UE may identify a scheduled time for communication on an unlicensed RF band.

In some implementations, the circuit/module for determining a time 1432 of FIG. 14 performs the operations of block 1602. In some implementations, the code for determining a time 1448 of FIG. 14 is executed to perform the operations of block 1602.

At block 1604, the apparatus sends information over the unlicensed RF band at the time that is based on a token arrival time. For example, the UE sending uplink information to a serving TRP may be triggered by a token being added to a token bucket.

In some implementations, the circuit/module for communicating 1424 of FIG. 14 performs the operations of block 1604. In some implementations, the code for communicating 1440 of FIG. 14 is executed to perform the operations of block 1604.

Third Example Process

Figure 17:
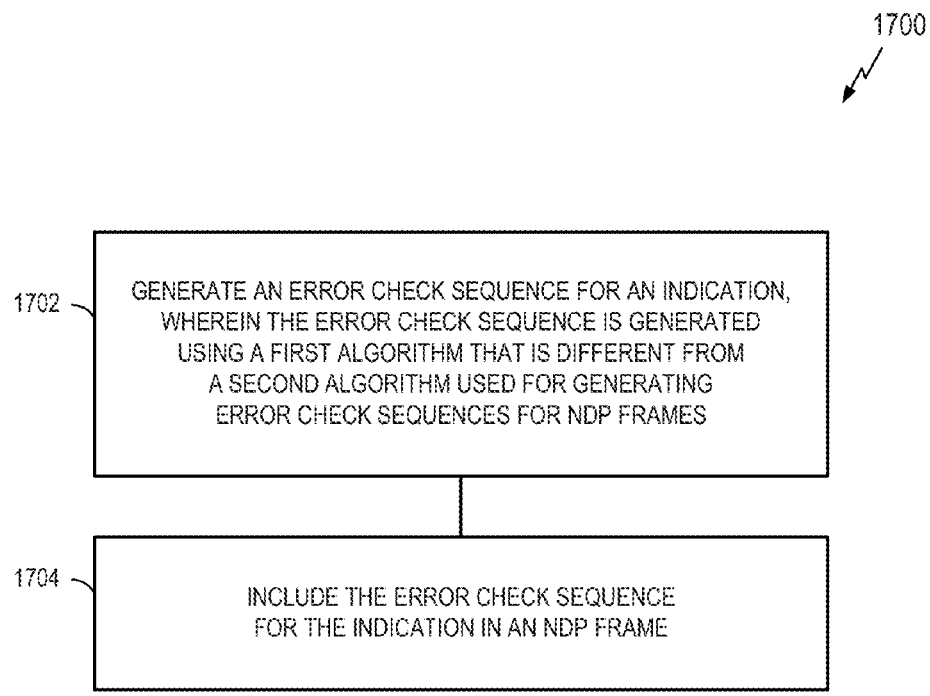
FIG. 17 is a flow diagram illustrating an example of an error check sequence process in accordance with some aspects of the disclosure.

FIG. 17 illustrates a process 1700 for communication in accordance with some aspects of the disclosure. In some implementations, the process 1700 may be performed in addition to (e.g., in conjunction with) the process 1500 of FIG. 15. The process 1700 may take place within a processing circuit (e.g., the processing circuit 1410 of FIG. 14), which may be located in a UE, an access terminal, a TRP, or some other suitable apparatus. In some implementations, the process 1700 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 1700 may be implemented by any suitable apparatus capable of supporting signaling-related operations.

At block 1702, an apparatus (e.g., a UE) generates an error check sequence for an indication. For example, a UE may generate CRC bits for the indication generated at block 1504 of FIG. 15. In some aspect, the error check sequence may be generated using a first algorithm that is different from a second algorithm used for generating error check sequences for NDP frames. For example, the first algorithm may invert, flip, or otherwise modify bits generated by a CRC algorithm used for IEEE 802.11 NDP frames.

In some implementations, the circuit/module for generating an error check sequence 1426 of FIG. 14 performs the operations of block 1702. In some implementations, the code for generating an error check sequence 1442 of FIG. 14 is executed to perform the operations of block 1702.

At block 1704, the apparatus includes the error check sequence (generated at block 1702) in an NDP frame. For example, the UE may include the generated CRC bits in an NDP frame that is used to send the indication at block 1506 of FIG. 15.

In some implementations, the circuit/module for including 1428 of FIG. 14 performs the operations of block 1704. In some implementations, the code for including 1444 of FIG. 14 is executed to perform the operations of block 1704.

Fourth Example Process

Figure 18:
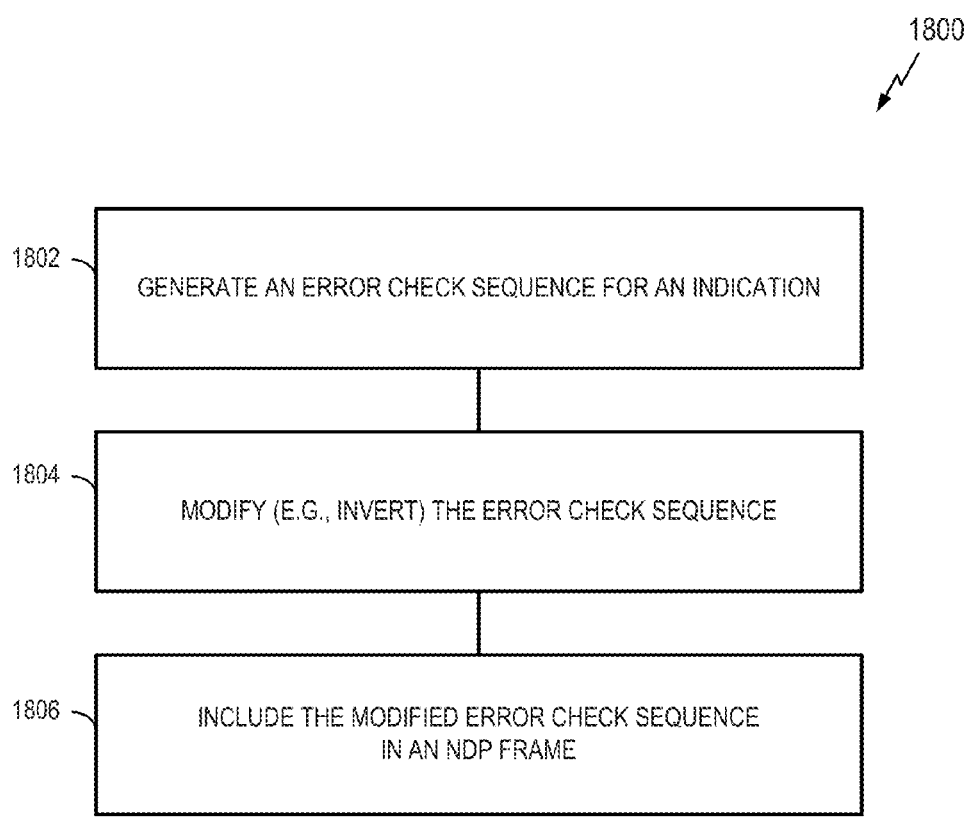
FIG. 18 is a flow diagram illustrating an example of a process that uses a modified error check sequence in accordance with some aspects of the disclosure.

FIG. 18 illustrates a process 1800 for communication in accordance with some aspects of the disclosure. In some implementations, the process 1800 may be performed in addition to (e.g., in conjunction with) the process 1500 of FIG. 15. The process 1800 may take place within a processing circuit (e.g., the processing circuit 1410 of FIG. 14), which may be located in a UE, an access terminal, a TRP, or some other suitable apparatus. In some implementations, the process 1800 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 1800 may be implemented by any suitable apparatus capable of supporting signaling-related operations.

At block 1802, an apparatus (e.g., a UE) generates an error check sequence for an indication. For example, a UE may generate CRC bits for the indication as discussed above at block 1702 of FIG. 17.

In some implementations, the circuit/module for generating an error check sequence 1426 of FIG. 14 performs the operations of block 1802. In some implementations, the code for generating an error check sequence 1442 of FIG. 14 is executed to perform the operations of block 1802.

At block 1804, the apparatus modifies the error check sequence. For example, the UE may invert the error check sequence.

In some implementations, the circuit/module for modifying 1430 of FIG. 14 performs the operations of block 1804. In some implementations, the code for modifying 1446 of FIG. 14 is executed to perform the operations of block 1804.

At block 1806, the apparatus includes the modified (e.g., inverted) error check sequence in an NDP frame. For example, the UE may include the modified CRC bits in an NDP frame that is used to send the indication at block 1506 of FIG. 15.

In some implementations, the circuit/module for including 1428 of FIG. 14 performs the operations of block 1806. In some implementations, the code for including 1444 of FIG. 14 is executed to perform the operations of block 1806.

Fifth Example Process

Figure 19:
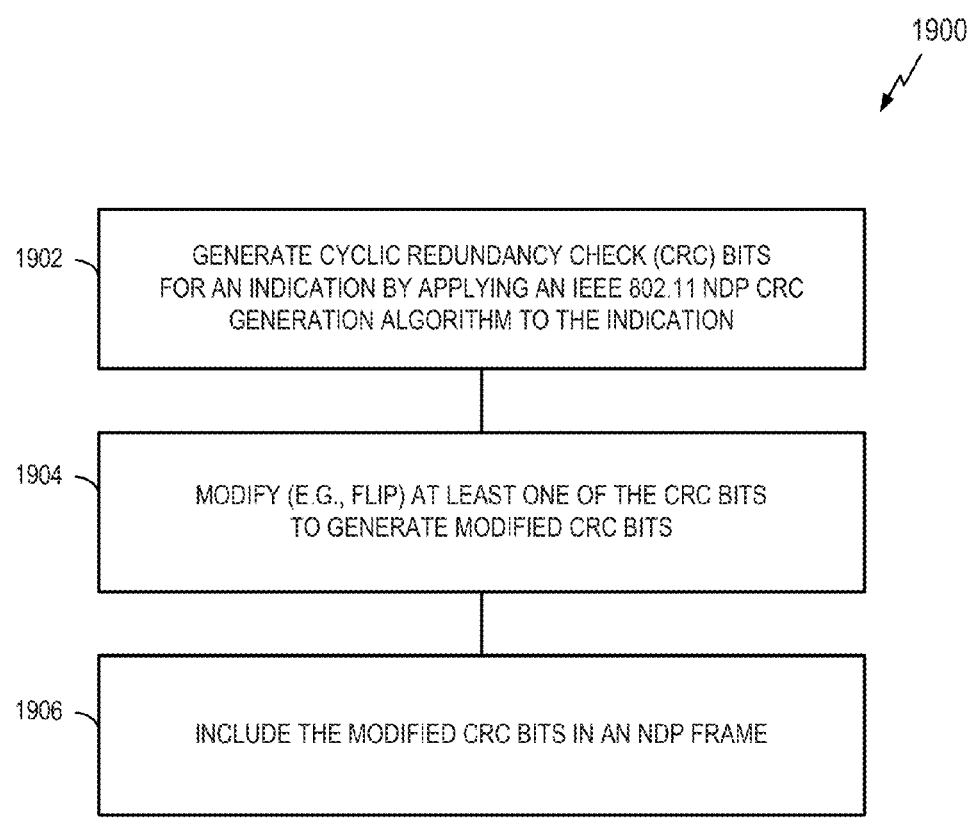
FIG. 19 is a flow diagram illustrating an example of a process that uses modified cyclic redundancy check bits in accordance with some aspects of the disclosure.

FIG. 19 illustrates a process 1900 for communication in accordance with some aspects of the disclosure. In some implementations, the process 1900 may be performed in addition to (e.g., in conjunction with) the process 1500 of FIG. 15. The process 1900 may take place within a processing circuit (e.g., the processing circuit 1410 of FIG. 14), which may be located in a UE, an access terminal, a TRP, or some other suitable apparatus. In some implementations, the process 1900 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 1900 may be implemented by any suitable apparatus capable of supporting signaling-related operations.

At block 1902, an apparatus (e.g., a UE) generates cyclic redundancy check (CRC) bits for an indication by applying an IEEE 802.11 NDP CRC generation algorithm to the indication. For example, a UE may generate CRC bits for the indication as discussed above at block 1702 of FIG. 17.

In some implementations, the circuit/module for generating an error check sequence 1426 of FIG. 14 performs the operations of block 1902. In some implementations, the code for generating an error check sequence 1442 of FIG. 14 is executed to perform the operations of block 1902.

At block 1904, the apparatus modifies at least one of the CRC bits from block 1902 to generate modified CRC bits. For example, the UE may flip at least one of the CRC bits (e.g., from 0 to 1 or vice versa).

In some implementations, the circuit/module for modifying 1430 of FIG. 14 performs the operations of block 1904. In some implementations, the code for modifying 1446 of FIG. 14 is executed to perform the operations of block 1904.

At block 1906, the apparatus includes the modified (e.g., flipped) CRC bits from block 1904 in an NDP frame. For example, the UE may include the modified CRC bits in an NDP frame that is used to send the indication at block 1506 of FIG. 15.

In some implementations, the circuit/module for including 1428 of FIG. 14 performs the operations of block 1906. In some implementations, the code for including 1444 of FIG. 14 is executed to perform the operations of block 1906.

Sixth Example Process

Figure 20:
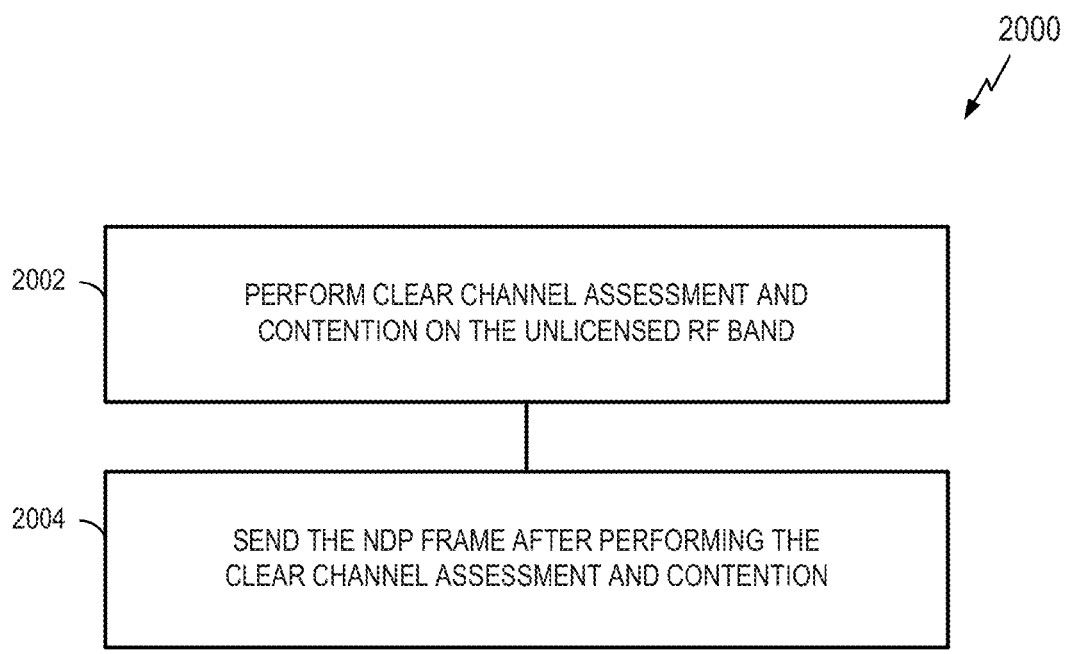
FIG. 20 is a flow diagram illustrating an example of a process for communicating a null data packet frame in accordance with some aspects of the disclosure.

FIG. 20 illustrates a process 2000 for communication in accordance with some aspects of the disclosure. In some implementations, the process 2000 may be performed in addition to (e.g., in conjunction with) the process 1500 of FIG. 15. The process 2000 may take place within a processing circuit (e.g., the processing circuit 1410 of FIG. 14), which may be located in a UE, an access terminal, a TRP, or some other suitable apparatus. In some implementations, the process 2000 represents operations performed, at least in part, by the UE 104 of FIG. 1, the wireless communication node 216 or 222 of FIG. 2, or the IoE device 236 or 242 of FIG. 2. Of course, in various aspects within the scope of the disclosure, the process 2000 may be implemented by any suitable apparatus capable of supporting signaling-related operations.

At block 2002, an apparatus (e.g., a UE) performs clear channel assessment and contention on the unlicensed RF band. For example, a UE may include a Wi-Fi transceiver (or receiver) that is configured to monitor Wi-Fi channels. Accordingly, the UE can monitor for request-to-send (RTS), CTS, or other Wi-Fi contention signaling.

In some implementations, the circuit/module for performing 1434 of FIG. 14 performs the operations of block 2002. In some implementations, the code for performing 1450 of FIG. 14 is executed to perform the operations of block 2002.

At block 2004, the apparatus sends an NDP frame after performing the clear channel assessment and contention of block 2002. For example, the UE may send an NDP frame that includes the indication discussed above at block 1506 of FIG. 15.

In some implementations, the circuit/module for communicating 1424 of FIG. 14 performs the operations of block 2004. In some implementations, the code for communicating 1440 of FIG. 14 is executed to perform the operations of block 2004.

Second Example Apparatus

Figure 21:
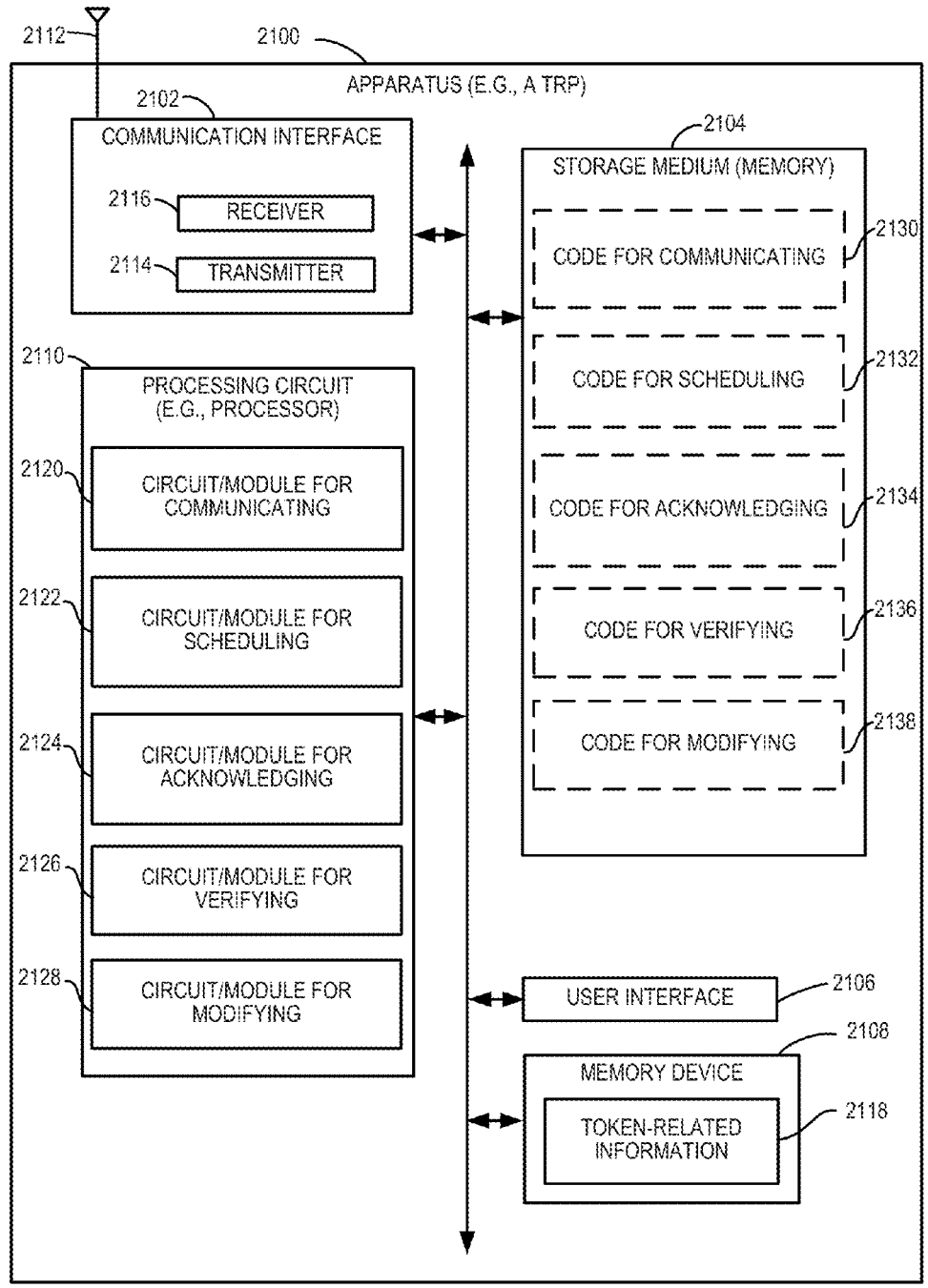
FIG. 21 is a block diagram illustrating an example hardware implementation for another apparatus (e.g., an electronic device) that can support a resource requirement signaling scheme in accordance with some aspects of the disclosure.

FIG. 21 is an illustration of an apparatus 2100 that may support scheduling according to one or more aspects of the disclosure. The apparatus 2100 could embody or be implemented within a TRP, a base station, a UE, or some other type of device that supports wireless communication. In various implementations, the apparatus 2100 could embody or be implemented within an access point, an access terminal, or some other type of device. In various implementations, the apparatus 2100 could embody or be implemented within a network entity, a mobile phone, a smart phone, a tablet, a portable computer, a server, a personal computer, a sensor, an entertainment device, a medical device, or any other electronic device having circuitry.

The apparatus 2100 includes a communication interface 2102 (e.g., at least one transceiver), a storage medium 2104, a user interface 2106, a memory device 2108 (e.g., storing token-related information 2118), and a processing circuit 2110 (e.g., a processor). In various implementations, the user interface 2106 may include one or more of: a keypad, a display, a speaker, a microphone, a touchscreen display, of some other circuitry for receiving an input from or sending an output to a user. The communication interface 2102 may be coupled to one or more antennas 2112, and may include a transmitter 2114 and a receiver 2116. In general, the components of FIG. 21 may be similar to corresponding components of the apparatus 1400 of FIG. 14.

According to one or more aspects of the disclosure, the processing circuit 2110 may be adapted to perform any or all of the features, processes, functions, operations and/or routines for any or all of the apparatuses described herein. For example, the processing circuit 2110 may be configured to perform any of the steps, functions, and/or processes described with respect to FIGS. 1-4, 6-13, and 22-25. As used herein, the term "adapted" in relation to the processing circuit 2110 may refer to the processing circuit 2110 being one or more of configured, used, implemented, and/or programmed to perform a particular process, function, operation and/or routine according to various features described herein.

The processing circuit 2110 may be a specialized processor, such as an application specific integrated circuit (ASIC) that serves as a means for (e.g., structure for) carrying out any one of the operations described in conjunction with FIGS. 1-4, 6-13, and 22-25. The processing circuit 2110 may serve as one example of a means for transmitting and/or a means for receiving. In various implementations, the processing circuit 2110 may incorporate the functionality of the TRP 102 (e.g., the scheduler 114) of FIG. 1 or the TRP 201 of FIG. 2.

According to at least one example of the apparatus 2100, the processing circuit 2110 may include one or more of a circuit/module for communicating 2120, a circuit/module for scheduling 2122, a circuit/module for acknowledging 2124, a circuit/module for verifying 2126, or a circuit/module for modifying 2128. In various implementations, the circuit/module for communicating 2120, the circuit/module for scheduling 2122, the circuit/module for acknowledging 2124, the circuit/module for verifying 2126, or the circuit/module for modifying 2128 may correspond, at least in part, to the functionality of the TRP 102 (e.g., the scheduler 114) of FIG. 1 or the TRP 201 of FIG. 2.

As mentioned above, programming stored by the storage medium 2104, when executed by the processing circuit 2110, causes the processing circuit 2110 to perform one or more of the various functions and/or process operations described herein. For example, the programming, when executed by the processing circuit 2110, may cause the processing circuit 2110 to perform the various functions, steps, and/or processes described herein with respect to FIGS. 1-4, 6-13, and 22-25 in various implementations. As shown in FIG. 21, the storage medium 2104 may include one or more of code for communicating 2130, code for scheduling 2132, code for acknowledging 2134, code for verifying 2136, or code for modifying 2138. In various implementations, the code for communicating 2130, the code for scheduling 2132, the code for acknowledging 2134, the code for verifying 2136, or the code for modifying 2138 may be executed or otherwise used to provide the functionality described herein for the circuit/module for communicating 2120, the circuit/module for scheduling 2122, the circuit/module for acknowledging 2124, the circuit/module for verifying 2126, or the circuit/module for modifying 2128.

The circuit/module for communicating 2120 may include circuitry and/or programming (e.g., code for communicating 2130 stored on the storage medium 2104) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 2120 may receive an indication of a resource requirement (e.g., for communication of information via an unlicensed RF band). In some aspects, the circuit/module for communicating 2120 may receive information over an unlicensed RF band (e.g., according to a scheduled resource and a token arrival time). In some aspects, the circuit/module for communicating 2120 may receive an error check sequence (e.g., for an indication).

In some implementations where the communicating involves receiving information, the circuit/module for communicating 2120 receives information (e.g., from the communication interface 2102, the receiver 2116, the memory device 2108, some other component of the apparatus 2100, or some other device), processes (e.g., decodes) the information, and outputs the information to another component of the apparatus 2100 (e.g., the memory device 2108, the circuit/module for scheduling 2122, the circuit/module for acknowledging 2124, the circuit/module for verifying 2126, the circuit/module for modifying 2128, or some other component). In some scenarios (e.g., if the circuit/module for communicating 2120 includes a receiver), the communicating involves the circuit/module for communicating 2120 receiving information directly from a device that transmitted the information (e.g., via radio frequency signaling or some other type of signaling suitable for the applicable communication medium).

In some implementations where the communicating involves sending information, the circuit/module for communicating 2120 obtains information (e.g., from the memory device 2108, or some other component of the apparatus 2100), processes (e.g., encodes) the information, and outputs the processed information. In some scenarios, the communicating involves sending the information to another component of the apparatus 2100 (e.g., the transmitter 2114, the communication interface 2102, or some other component) that will transmit the information to another device. In some scenarios (e.g., if the circuit/module for communicating 2120 includes a transmitter), the communicating involves the circuit/module for communicating 2120 transmitting the information directly to another device (e.g., the ultimate destination) via radio frequency signaling or some other type of signaling suitable for the applicable communication medium.

In some implementations, the circuit/module for communicating 2120 is a transceiver. In some implementations, the circuit/module for communicating 2120 is a receiver. In some implementations, the circuit/module for communicating 2120 is a transmitter. In some implementations, the communication interface 2102 includes the circuit/module for communicating 2120 and/or the code for communicating 2130. In some implementations, the circuit/module for communicating 2120 and/or the code for communicating 2130 is configured to control the communication interface 2102 (e.g., a transceiver, a receiver, or a transmitter) to communicate the information.

The circuit/module for scheduling 2122 may include circuitry and/or programming (e.g., code for scheduling 2132 stored on the storage medium 2104) adapted to perform several functions relating to, for example, scheduling at least one resource (e.g., on an unlicensed RF band) for communication of information. In some implementations, the circuit/module for scheduling 2122 determines that a resource needs to be scheduled (e.g., based on information from the circuit/module for communicating 21202, the memory device 2108, the communication interface 2102, the receiver 2116, or some other component). The circuit/module for scheduling 2122 then determines which resources are available and sufficient to meet the resource requirement. The circuit/module for scheduling 2122 then outputs an indication of the schedule (e.g., designating one or more timeslots) to a component of the apparatus 2100 (e.g., to the circuit/module for communicating 2120, the memory device 2108, the communication interface 2102, or some other component).

The circuit/module for acknowledging 2124 may include circuitry and/or programming (e.g., code for acknowledging 2134 stored on the storage medium 2104) adapted to perform several functions relating to, for example, acknowledging receipt of an indication (e.g., by sending a message that includes the indication). In some implementations, the circuit/module for acknowledging 2124 determines whether the indication has been successfully received (e.g., based on a signal from the circuit/module for communicating 2120, the memory device 2108, the communication interface 2102, the receiver 2116, or some other component). If the receipt was successful, the circuit/module for acknowledging 2124 generates an acknowledgement (e.g., including the received indication). The circuit/module for acknowledging 2124 then causes the acknowledgment to be sent to the device that sent the indication (e.g., via the circuit/module for communicating 2120, the memory device 2108, the communication interface 2102, or some other component).

The circuit/module for verifying 2126 may include circuitry and/or programming (e.g., code for verifying 2136 stored on the storage medium 2104) adapted to perform several functions relating to, for example, verifying an error check sequence (e.g., using a first algorithm that is different from a second algorithm used for generating error check sequences for NDP frames). In some aspects, the error check sequence may be at least one CRC bit. In some aspects, the error check sequence may be a modified error check sequence. Initially, the circuit/module for verifying 2126 obtains the error check sequence (e.g., from the circuit/module for communicating 2120, the circuit/module for modifying 2128, the receiver 2116, the memory device 2108, the communication interface 2102, or some other component). In some implementations, the circuit/module for verifying 2126 inverts, bit flips, or otherwise modifies the error check sequence (e.g., if it has not already been modified) and performs a CRC check on the modified error check sequence. The circuit/module for verifying 2126 then outputs an indication of whether the error check sequence passed the verification (e.g., to the circuit/module for communicating 2120, the memory device 2108, the communication interface 2102, or some other component).

The circuit/module for modifying 2128 may include circuitry and/or programming (e.g., code for modifying 2138 stored on the storage medium 2104) adapted to perform several functions relating to, for example, modifying an error check sequence. In some aspects, the error check sequence may be at least one CRC bit. Initially, the circuit/module for modifying 2128 obtains the error check sequence (e.g., from the circuit/module for communicating 2120, the circuit/module for verifying 2126, the receiver 2116, the memory device 2108, the communication interface 2102, or some other component). In some implementations, the circuit/module for modifying 2128 inverts, bit flips, or otherwise modifies the error check sequence. The circuit/module for modifying 2128 then outputs the modified error check sequence (e.g., to the circuit/module for verifying 2126, the circuit/module for communicating 2120, the memory device 2108, the communication interface 2102, or some other component).

Seventh Example Process

Figure 22:
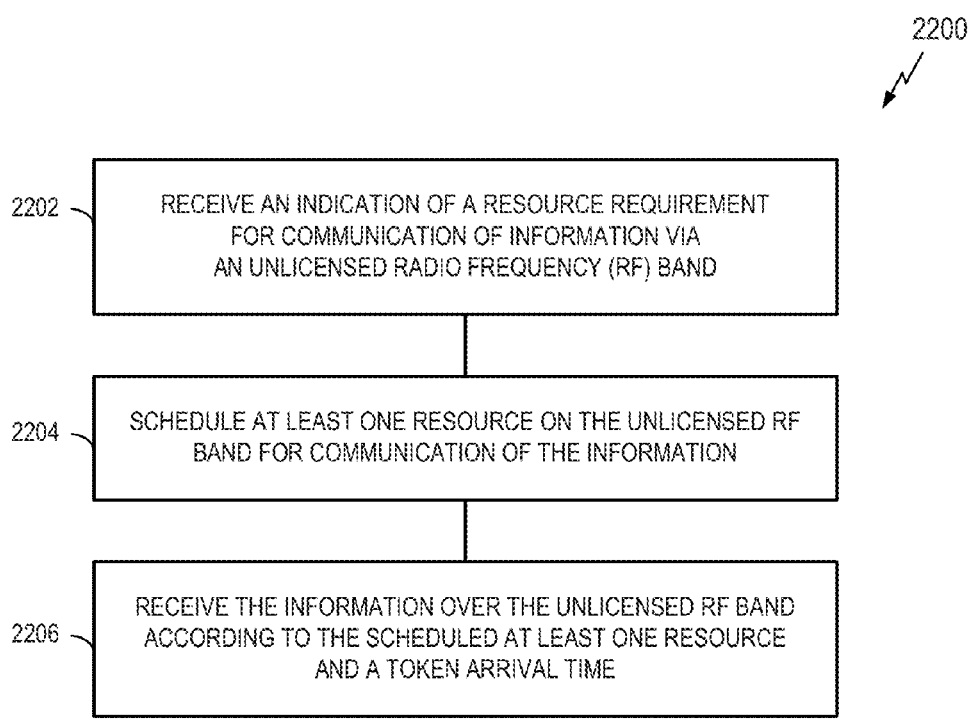
FIG. 22 is a flow diagram illustrating an example of another resource requirement signaling process in accordance with some aspects of the disclosure.

FIG. 22 illustrates a process 2200 for communication in accordance with some aspects of the disclosure. The process 2200 may take place within a processing circuit (e.g., the processing circuit 2110 of FIG. 21), which may be located in a TRP, an access terminal, or some other suitable apparatus. In some implementations, the process 2200 represents operations performed, at least in part, by the TRP 102 of FIG. 1 or the TRP 201 of FIG. 2. Of course, in various aspects within the scope of the disclosure, the process 2200 may be implemented by any suitable apparatus capable of supporting scheduling-related operations.

At block 2202, an apparatus (e.g., a TRP) receives an indication of a resource requirement for communication of information via an unlicensed radio frequency (RF) band. For example, a TRP may receive the indication sent at block 1506 of FIG. 15. In some aspects, the resource requirement may include an uplink resource requirement for the unlicensed RF band.

The indication may be received in various ways in different scenarios. In some aspects, the indication may be received via a null data packet (NDP) frame. In some aspects, the indication may be received via a licensed RF band. In some aspects, the indication may be received using 5G technology. In some aspects, the indication may be received via the unlicensed RF band. In some aspects, the indication may be received using wireless local area network (WLAN) technology. In some aspects, the indication may be received using Institute of Electrical and Electronics Engineers (IEEE) 802.11 technology.

In some implementations, the circuit/module for communicating 2120 of FIG. 21 performs the operations of block 2202. In some implementations, the code for communicating 2130 of FIG. 21 is executed to perform the operations of block 2202.

At block 2204, the apparatus schedules at least one resource on the unlicensed RF band for communication of the information. For example, the TRP may schedule a 5G access block as shown in FIG. 3.

In some implementations, the circuit/module for scheduling 2122 of FIG. 21 performs the operations of block 2204. In some implementations, the code for scheduling 2132 of FIG. 21 is executed to perform the operations of block 2204.

At block 2206, the apparatus receives the information over the unlicensed RF band according to the at least one resource scheduled at block 2204 and a token arrival time. For example, after the token arrival time, the TRP may send a downlink signal at the beginning of a 5G access block to trigger a scheduled UE to send data during the 5G access block. The TRP can subsequently receive any information sent by the UE over the scheduled resource(s).

In some implementations, the circuit/module for communicating 2120 of FIG. 21 performs the operations of block 2206. In some implementations, the code for communicating 2130 of FIG. 21 is executed to perform the operations of block 2206.

Eighth Example Process

Figure 23:
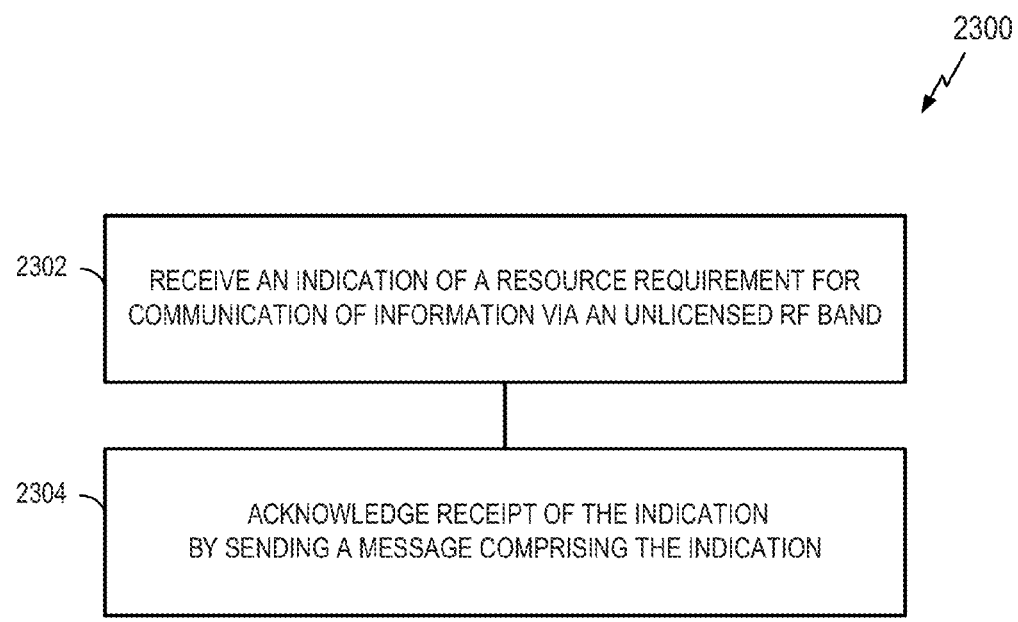
FIG. 23 is a flow diagram illustrating an example of a resource requirement acknowledgment process in accordance with some aspects of the disclosure.

FIG. 23 illustrates a process 2300 for communication in accordance with some aspects of the disclosure. In some implementations, the process 2300 may be performed in addition to (e.g., in conjunction with) the process 2200 of FIG. 22. The process 2300 may take place within a processing circuit (e.g., the processing circuit 2110 of FIG. 21), which may be located in a TRP, an access terminal, or some other suitable apparatus. In some implementations, the process 2300 represents operations performed, at least in part, by the TRP 102 of FIG. 1 or the TRP 201 of FIG. 2. Of course, in various aspects within the scope of the disclosure, the process 2300 may be implemented by any suitable apparatus capable of supporting scheduling-related operations.

At block 2302, an apparatus (e.g., a TRP) receives an indication of a resource requirement for communication of information via an unlicensed radio frequency (RF) band. For example, a TRP may receive an indication from a UE as discussed above in conjunction with block 2202 of FIG. 22.

In some implementations, the circuit/module for communicating 2120 of FIG. 21 performs the operations of block 2302. In some implementations, the code for communicating 2130 of FIG. 21 is executed to perform the operations of block 2302.

At block 2304, the apparatus acknowledges receipt of the indication by sending a message comprising the indication. For example, the TRP may send the message to the UE via the licensed band or the unlicensed band.

In some implementations, the circuit/module for acknowledging 2124 of FIG. 21 performs the operations of block 2304. In some implementations, the code for acknowledging 2134 of FIG. 21 is executed to perform the operations of block 2304.

Ninth Example Process

Figure 24:
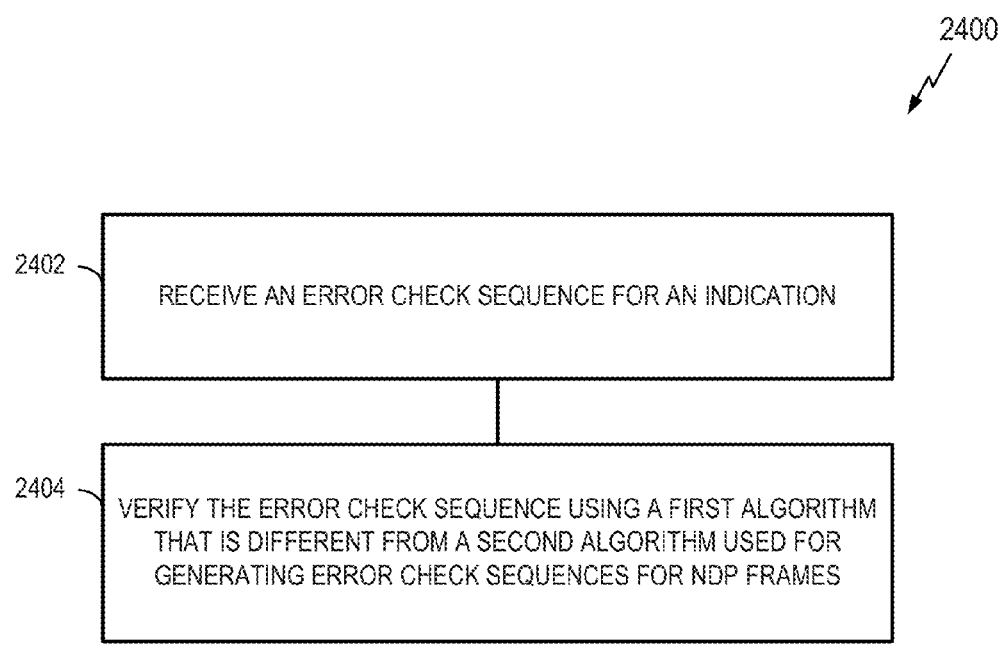
FIG. 24 is a flow diagram illustrating an example of another error check sequence process in accordance with some aspects of the disclosure.

FIG. 24 illustrates a process 2400 for communication in accordance with some aspects of the disclosure. In some implementations, the process 2400 may be performed in addition to (e.g., in conjunction with) the process 2200 of FIG. 22. The process 2400 may take place within a processing circuit (e.g., the processing circuit 2110 of FIG. 21), which may be located in a TRP, an access terminal, or some other suitable apparatus. In some implementations, the process 2400 represents operations performed, at least in part, by the TRP 102 of FIG. 1 or the TRP 201 of FIG. 2. Of course, in various aspects within the scope of the disclosure, the process 2400 may be implemented by any suitable apparatus capable of supporting scheduling-related operations.

At block 2402, an apparatus (e.g., a TRP) receives an error check sequence (e.g., CRC bits) for an indication. For example, a TRP may receive an error check sequence for the indication received at block 2202 of FIG. 22. In some cases, the error check sequence is received via an NDP frame (e.g., as discussed above in conjunction with block 1702 of FIG. 17, block 1806 of FIG. 18, or block 1906 of FIG. 19).

In some implementations, the circuit/module for communicating 2120 of FIG. 21 performs the operations of block 2402. In some implementations, the code for communicating 2130 of FIG. 21 is executed to perform the operations of block 2402.

At block 2404, the apparatus verifies the error check sequence (received at block 2402) using a first algorithm that is different from a second algorithm used for generating error check sequences for NDP frames. For example, the first algorithm may invert, flip, or otherwise modify bits prior to running an IEEE 802.11 CRC algorithm.

In some implementations, the circuit/module for verifying 2126 of FIG. 21 performs the operations of block 2404. In some implementations, the code for verifying 2136 of FIG. 21 is executed to perform the operations of block 2404.

Tenth Example Process

Figure 25:
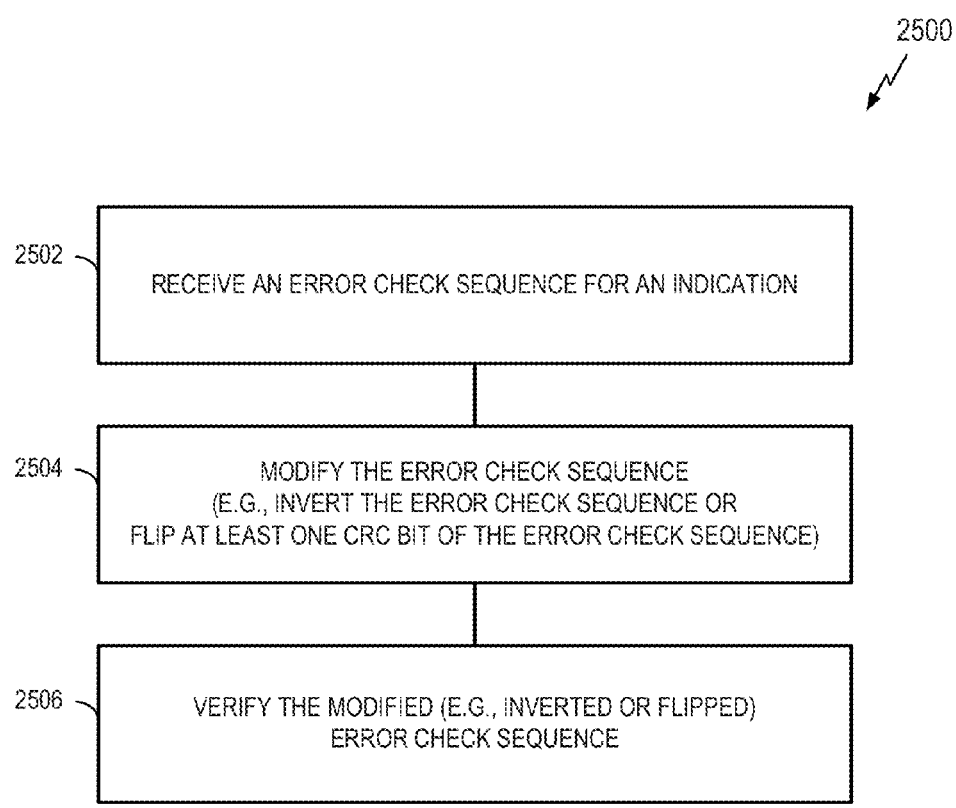
FIG. 25 is a flow diagram illustrating an example of another process that uses a modified error check sequence in accordance with some aspects of the disclosure.

FIG. 25 illustrates a process 2500 for communication in accordance with some aspects of the disclosure. In some implementations, the process 2500 may be performed in addition to (e.g., in conjunction with) the process 2200 of FIG. 22. The process 2500 may take place within a processing circuit (e.g., the processing circuit 2110 of FIG. 21), which may be located in a TRP, an access terminal, or some other suitable apparatus. In some implementations, the process 2500 represents operations performed, at least in part, by the TRP 102 of FIG. 1 or the TRP 201 of FIG. 2. Of course, in various aspects within the scope of the disclosure, the process 2500 may be implemented by any suitable apparatus capable of supporting scheduling-related operations.

At block 2502, an apparatus (e.g., a TRP) receives an error check sequence for an indication. For example, a TRP may receive an error check sequence from a UE as discussed above in conjunction with block 2402 of FIG. 24.

In some implementations, the circuit/module for communicating 2120 of FIG. 21 performs the operations of block 2502. In some implementations, the code for communicating 2130 of FIG. 21 is executed to perform the operations of block 2502.

At block 2504, the apparatus modifies the error check sequence. For example, the TRP may invert the received error check sequence (e.g., CRC bits) or flip at least one bit of the received error check sequence.

In some implementations, the circuit/module for modifying 2128 of FIG. 21 performs the operations of block 2504. In some implementations, the code for modifying 2138 of FIG. 21 is executed to perform the operations of block 2504.

At block 2506, the apparatus verifies the modified (e.g., inverted or flipped) error check sequence. For example, the TRP may generate an error check sequence for the indication received at block 2202 of FIG. 22 and compare this error check sequence with the inverted error check sequence from block 2504.

In some implementations, the circuit/module for verifying 2126 of FIG. 21 performs the operations of block 2506. In some implementations, the code for verifying 2136 of FIG. 21 is executed to perform the operations of block 2506.

Third Example Apparatus

Figure 26:
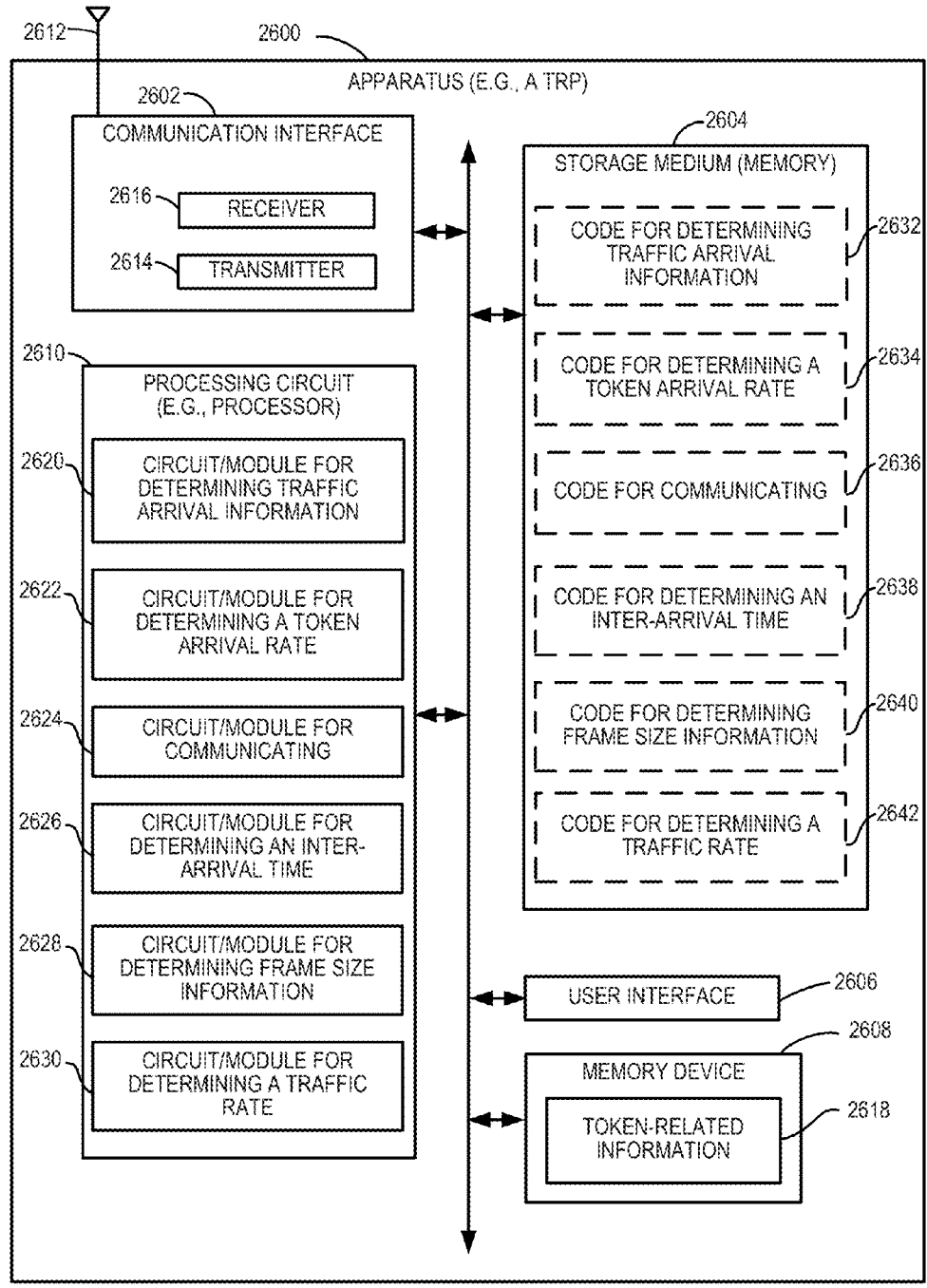
FIG. 26 is a block diagram illustrating an example hardware implementation for another apparatus (e.g., an electronic device) that can support a token-based scheme in accordance with some aspects of the disclosure.

FIG. 26 is an illustration of an apparatus 2600 that may support scheduling according to one or more aspects of the disclosure. The apparatus 2600 could embody or be implemented within a TRP, a base station, a UE, or some other type of device that supports wireless communication. In various implementations, the apparatus 2600 could embody or be implemented within an access point, an access terminal, or some other type of device. In various implementations, the apparatus 2600 could embody or be implemented within a network entity, a mobile phone, a smart phone, a tablet, a portable computer, a server, a personal computer, a sensor, an entertainment device, a medical device, or any other electronic device having circuitry.

The apparatus 2600 includes a communication interface 2602 (e.g., at least one transceiver), a storage medium 2604, a user interface 2606, a memory device 2608 (e.g., storing token-related information 2618), and a processing circuit 2610 (e.g., a processor). In various implementations, the user interface 2606 may include one or more of: a keypad, a display, a speaker, a microphone, a touchscreen display, of some other circuitry for receiving an input from or sending an output to a user. The communication interface 2602 may be coupled to one or more antennas 2612, and may include a transmitter 2614 and a receiver 2616. In general, the components of FIG. 26 may be similar to corresponding components of the apparatus 1400 of FIG. 14.

According to one or more aspects of the disclosure, the processing circuit 2610 may be adapted to perform any or all of the features, processes, functions, operations and/or routines for any or all of the apparatuses described herein. For example, the processing circuit 2610 may be configured to perform any of the steps, functions, and/or processes described with respect to FIGS. 1-4, 7, 8, 10-13, and 27-30. As used herein, the term "adapted" in relation to the processing circuit 2610 may refer to the processing circuit 2610 being one or more of configured, used, implemented, and/or programmed to perform a particular process, function, operation and/or routine according to various features described herein.

The processing circuit 2610 may be a specialized processor, such as an application specific integrated circuit (ASIC) that serves as a means for (e.g., structure for) carrying out any one of the operations described in conjunction with FIGS. 1-4, 7, 8, 10-13, and 27-30. The processing circuit 2610 may serve as one example of a means for transmitting and/or a means for receiving. In various implementations, the processing circuit 2610 may incorporate the functionality of the TRP 102 (e.g., the scheduler 114) of FIG. 1 or the TRP 201 of FIG. 2.

According to at least one example of the apparatus 2600, the processing circuit 2610 may include one or more of a circuit/module for determining traffic arrival information 2620, a circuit/module for determining a token arrival rate 2622, a circuit/module for communicating 2624, a circuit/module for determining an inter-arrival time 2626, a circuit/module for determining frame size information 2628, or a circuit/module for determining a traffic rate 2630. In various implementations, the circuit/module for determining traffic arrival information 2620, the circuit/module for determining the token arrival rate 2622, the circuit/module for communicating 2624, the circuit/module for determining an inter-arrival time 2626, the circuit/module for determining frame size information 2628, or the circuit/module for determining a traffic rate 2630 may correspond, at least in part, to the functionality of the TRP 102 (e.g., the scheduler 114) of FIG. 1 or the TRP 201 of FIG. 2.

As mentioned above, programming stored by the storage medium 2604, when executed by the processing circuit 2610, causes the processing circuit 2610 to perform one or more of the various functions and/or process operations described herein. For example, the programming, when executed by the processing circuit 2610, may cause the processing circuit 2610 to perform the various functions, steps, and/or processes described herein with respect to FIGS. 1-4, 7, 8, 10-13, and 27-30 in various implementations. As shown in FIG. 26, the storage medium 2604 may include one or more of code for determining traffic arrival information 2632, code for determining a token arrival rate 2634, code for communicating 2636, code for determining an inter-arrival time 2638, code for determining frame size information 2640, or code for determining a traffic rate 2642. In various implementations, the code for determining traffic arrival information 2632, the code for determining a token arrival rate 2634, the code for communicating 2636, the code for determining an inter-arrival time 2638, the code for determining frame size information 2640, or the code for determining a traffic rate 2642 may be executed or otherwise used to provide the functionality described herein for the circuit/module for determining traffic arrival information 2620, the circuit/module for determining the token arrival rate 2622, the circuit/module for communicating 2624, the circuit/module for determining an inter-arrival time 2626, the circuit/module for determining frame size information 2628, or the circuit/module for determining a traffic rate 2630.

The circuit/module for determining traffic arrival information 2620 may include circuitry and/or programming (e.g., code for determining traffic arrival information 2632 stored on the storage medium 2604) adapted to perform several functions relating to, determining traffic arrival information (e.g., on a Wi-Fi band and/or a 5G band). In some implementations, the circuit/module for determining traffic arrival information 2620 determines the traffic arrival rate for 5G traffic (e.g., using the circuit/module for communicating 2624, the receiver 2616, the memory device 2608, the communication interface 2602, or some other component) by monitoring 5G traffic flows. In some implementations, the circuit/module for determining traffic arrival information 2620 processes the traffic arrival rate information (e.g., by normalizing the traffic arrival rate to token size). The circuit/module for determining traffic arrival information 2620 then outputs an indication of the traffic arrival information (e.g., to the circuit/module for communicating 2624, the memory device 2608, the communication interface 2602, or some other component).

The circuit/module for determining a token arrival rate 2622 may include circuitry and/or programming (e.g., code for determining a token arrival rate 2634 stored on the storage medium 2604) adapted to perform several functions relating to, determining a token arrival rate based on one or more factors. In some implementations, the circuit/module for determining a token arrival rate 2622 determines the token arrival rate as a function of traffic arrival information (e.g., obtained from the circuit/module for determining traffic arrival information 2620, the circuit/module for communicating 2624, the receiver 2616, the memory device 2608, the communication interface 2602, or some other component). In some implementations, the circuit/module for determining a token arrival rate 2622 determines the token arrival rate based on an inter-arrival time (e.g., obtained from the circuit/module for determining an inter-arrival time 2626, the circuit/module for communicating 2624, the receiver 2616, the memory device 2608, the communication interface 2602, or some other component). In some implementations, the circuit/module for determining a token arrival rate 2622 determines the token arrival rate based on frame size information (e.g., obtained from the circuit/module for determining frame size information 2628, the circuit/module for communicating 2624, the receiver 2616, the memory device 2608, the communication interface 2602, or some other component). In some implementations, the circuit/module for determining a token arrival rate 2622 determines the token arrival rate using the operations described below in conjunction with FIGS. 28 and 29. The circuit/module for determining a token arrival rate 2622 then outputs an indication of the token arrival rate (e.g., to the circuit/module for communicating 2624, the memory device 2608, the communication interface 2602, or some other component).

The circuit/module for communicating 2624 may include circuitry and/or programming (e.g., code for communicating 2636 stored on the storage medium 2604) adapted to perform several functions relating to, for example, communicating information (e.g., on an unlicensed RF band at times that are based on a token arrival rate). In some implementations, the communication involves receiving the information. In some implementations, the communication involves sending (e.g., transmitting) the information. In some aspects, the circuit/module for communicating 2624 may receive information on an unlicensed RF band at times that are based on a token arrival rate.

In some implementations where the communicating involves receiving information, the circuit/module for communicating 2624 receives information (e.g., from the communication interface 2602, the receiver 2616, the memory device 2608, some other component of the apparatus 2600, or some other device), processes (e.g., decodes) the information, and outputs the information to another component of the apparatus 2600 (e.g., the memory device 2608 or some other component). In some scenarios (e.g., if the circuit/module for communicating 2624 includes a receiver), the communicating involves the circuit/module for communicating 2624 receiving information directly from a device that transmitted the information (e.g., via radio frequency signaling or some other type of signaling suitable for the applicable communication medium). In some scenarios, the circuit/module for communicating 2624 receives an indication of a token arrival rate (e.g., from the circuit/module for determining a token arrival rate 2622, the memory device 2608, or some other component) and determines a time for communicating (e.g., receiving information) based on the token arrival rate (e.g., as discussed below in conjunction with FIG. 27).

In some implementations where the communicating involves sending information, the circuit/module for communicating 2624 obtains information (e.g., from the memory device 2608, or some other component of the apparatus 2600), processes (e.g., encodes) the information, and outputs the processed information. In some scenarios, the communicating involves sending the information to another component of the apparatus 2600 (e.g., the transmitter 2614, the communication interface 2602, or some other component) that will transmit the information to another device. In some scenarios (e.g., if the circuit/module for communicating 2624 includes a transmitter), the communicating involves the circuit/module for communicating 2624 transmitting the information directly to another device (e.g., the ultimate destination) via radio frequency signaling or some other type of signaling suitable for the applicable communication medium.

In some implementations, the circuit/module for communicating 2624 is a transceiver. In some implementations, the circuit/module for communicating 2624 is a receiver. In some implementations, the circuit/module for communicating 2624 is a transmitter. In some implementations, the communication interface 2602 includes the circuit/module for communicating 2624 and/or the code for communicating 2636. In some implementations, the circuit/module for communicating 2624 and/or the code for communicating 2636 is configured to control the communication interface 2602 (e.g., a transceiver, a receiver, or a transmitter) to communicate the information.

The circuit/module for determining an inter-arrival time 2626 may include circuitry and/or programming (e.g., code for determining an inter-arrival time 2638 stored on the storage medium 2604) adapted to perform several functions relating to, determining an inter-arrival time for IEEE 802.11 traffic or other types of traffic. In some implementations, the circuit/module for determining an inter-arrival time 2626 monitors traffic arrivals over time (e.g., using the circuit/module for communicating 2624, the receiver 2616, the memory device 2608, the communication interface 2602, or some other component). In some implementations, the circuit/module for determining an inter-arrival time 2626 processes the monitored traffic (e.g., by calculating a mean inter-arrival time). The circuit/module for determining an inter-arrival time 2626 then outputs an indication of the inter-arrival time (e.g., to the circuit/module for determining a token arrival rate 2622, the circuit/module for communicating 2624, the memory device 2608, the communication interface 2602, or some other component).

The circuit/module for determining frame size information 2628 may include circuitry and/or programming (e.g., code for determining frame size information 2640 stored on the storage medium 2604) adapted to perform several functions relating to, determining a frame size for IEEE 802.11 traffic or other types of traffic. In some implementations, the circuit/module for determining frame size information 2628 monitors received frame sizes over time (e.g., using the circuit/module for communicating 2624, the receiver 2616, the memory device 2608, the communication interface 2602, or some other component). In some implementations, the circuit/module for determining frame size information 2628 processes the monitored frame size information (e.g., by calculating a mean frame size). The circuit/module for determining frame size information 2628 then outputs the frame size information (e.g., to the circuit/module for determining a token arrival rate 2622, the circuit/module for communicating 2624, the memory device 2608, the communication interface 2602, or some other component).

The circuit/module for determining a traffic rate 2630 may include circuitry and/or programming (e.g., code for determining a traffic rate 2642 stored on the storage medium 2604) adapted to perform several functions relating to, determining a traffic rate based on a token arrival rate. In some implementations, the circuit/module for determining a traffic rate 2630 obtains the token arrival rate (e.g., from the circuit/module for determining a token arrival rate 2622, the circuit/module for communicating 2624, the memory device 2608, the communication interface 2602, or some other component). In some implementations, the circuit/module for determining a traffic rate 2630 calculates the traffic rate accordingly (e.g., by multiplying the token arrival rate by a factor). For example, the traffic rate may be set to be less than or equal to 0.9 times the token arrival rate. The circuit/module for determining a traffic rate 2630 then outputs the traffic rate (e.g., to a scheduler, the circuit/module for communicating 2624, the memory device 2608, the communication interface 2602, or some other component).

Eleventh Example Process

Figure 27:
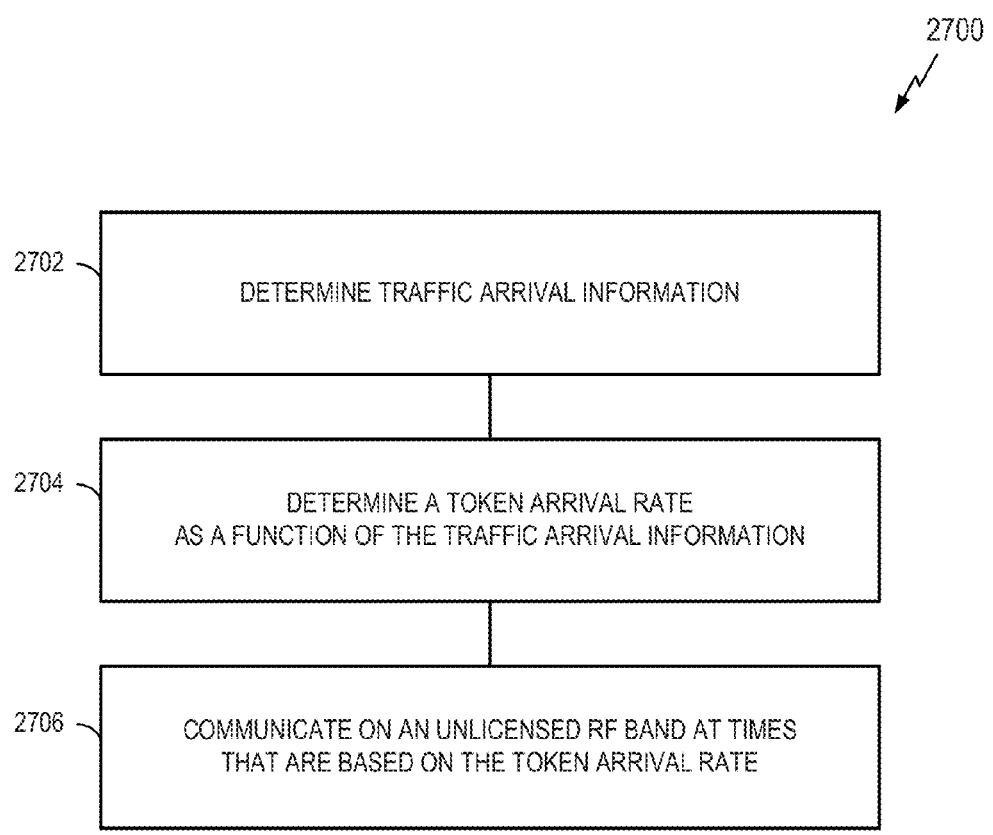
FIG. 27 is a flow diagram illustrating an example of a token-based process in accordance with some aspects of the disclosure.

FIG. 27 illustrates a process 2700 for communication in accordance with some aspects of the disclosure. The process 2700 may take place within a processing circuit (e.g., the processing circuit 2610 of FIG. 26), which may be located in a TRP, an access terminal, or some other suitable apparatus. In some implementations, the process 2700 represents operations performed, at least in part, by the TRP 102 of FIG. 1 or the TRP 201 of FIG. 2. Of course, in various aspects within the scope of the disclosure, the process 2700 may be implemented by any suitable apparatus capable of supporting rate setting-related operations. As one example of the process 2700, a TRP may receive an indication of Wi-Fi activity and then determine, based on the Wi-Fi activity, how often to contend for an unlicensed band.

At block 2702, an apparatus (e.g., a TRP) determines traffic arrival information. In some aspects, the traffic arrival information may include a traffic arrival rate for 5G traffic. In some aspects, the determination of the token arrival rate involves setting the token arrival rate to be greater than or equal to 1.1 times the traffic arrival rate.

In some implementations, the circuit/module for determining traffic arrival information 2620 of FIG. 26 performs the operations of block 2702. In some implementations, the code for determining traffic arrival information 2632 of FIG. 26 is executed to perform the operations of block 2702.

At block 2704, the apparatus determines a token arrival rate as a function of the traffic arrival information determined at block 2702. In some aspects, the token arrival rate may be a maximum rate. In some aspects, the token arrival rate may be normalized to token size. In some aspects, the determination of the token arrival rate involves setting the token arrival rate to be greater than or equal to 1.1 times the traffic arrival rate.

In some implementations, the circuit/module for determining a token arrival rate 2622 of FIG. 26 performs the operations of block 2704. In some implementations, the code for determining a token arrival rate 2634 of FIG. 26 is executed to perform the operations of block 2704.

At block 2706, the apparatus communicates on an unlicensed RF band at times that are based on the token arrival rate. For example, the TRP may monitor for traffic from a particular UE whenever a corresponding token is added to a token bucket.

In some implementations, the circuit/module for communicating 2624 of FIG. 26 performs the operations of block 2706. In some implementations, the code for communicating 2636 of FIG. 26 is executed to perform the operations of block 2706.

Twelfth Example Process

Figure 28:
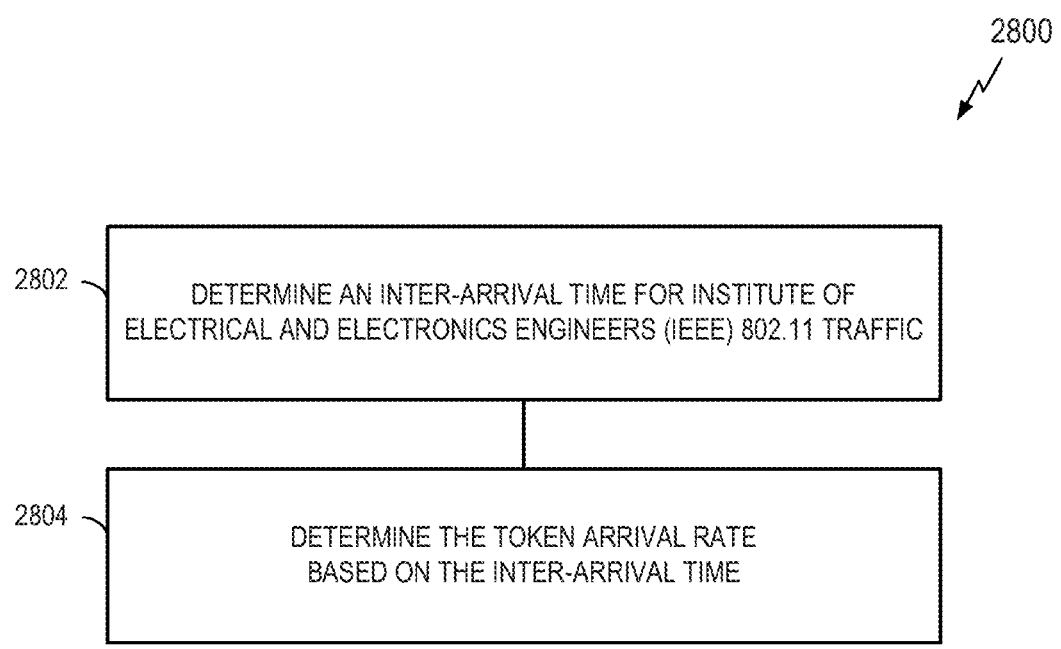
FIG. 28 is a flow diagram illustrating an example of a token arrival rate process in accordance with some aspects of the disclosure.

FIG. 28 illustrates a process 2800 for communication (e.g., determining a token arrival rate) in accordance with some aspects of the disclosure. In some implementations, the process 2800 may be performed in addition to (e.g., in conjunction with) the process 2700 of FIG. 27. The process 2800 may take place within a processing circuit (e.g., the processing circuit 2610 of FIG. 26), which may be located in a TRP, an access terminal, or some other suitable apparatus. In some implementations, the process 2800 represents operations performed, at least in part, by the TRP 102 of FIG. 1 or the TRP 201 of FIG. 2. Of course, in various aspects within the scope of the disclosure, the process 2800 may be implemented by any suitable apparatus capable of supporting rate setting-related operations.

At block 2802, an apparatus (e.g., a TRP) determines an inter-arrival time for Institute of Electrical and Electronics Engineers (IEEE) 802.11 traffic. In some aspects, the inter-arrival time may be a mean inter-arrival time.

In some implementations, the circuit/module for determining an inter-arrival time 2626 of FIG. 26 performs the operations of block 2802. In some implementations, the code for determining an inter-arrival time 2638 of FIG. 26 is executed to perform the operations of block 2802.

At block 2804, the apparatus determines a token arrival rate (e.g., for block 2704 of FIG. 27) based on the inter-arrival time determined at block 2802. For example, a TRP may determine the optimal token arrival rate given a particular Wi-Fi frame arrival rate to ensure that Wi-Fi traffic latency is below a threshold as discussed above in conjunction with FIGS. 12 and 13.

In some implementations, the circuit/module for determining a token arrival rate 2622 of FIG. 26 performs the operations of block 2804. In some implementations, the code for determining a token arrival rate 2634 of FIG. 26 is executed to perform the operations of block 2804.

Thirteenth Example Process

Figure 29:
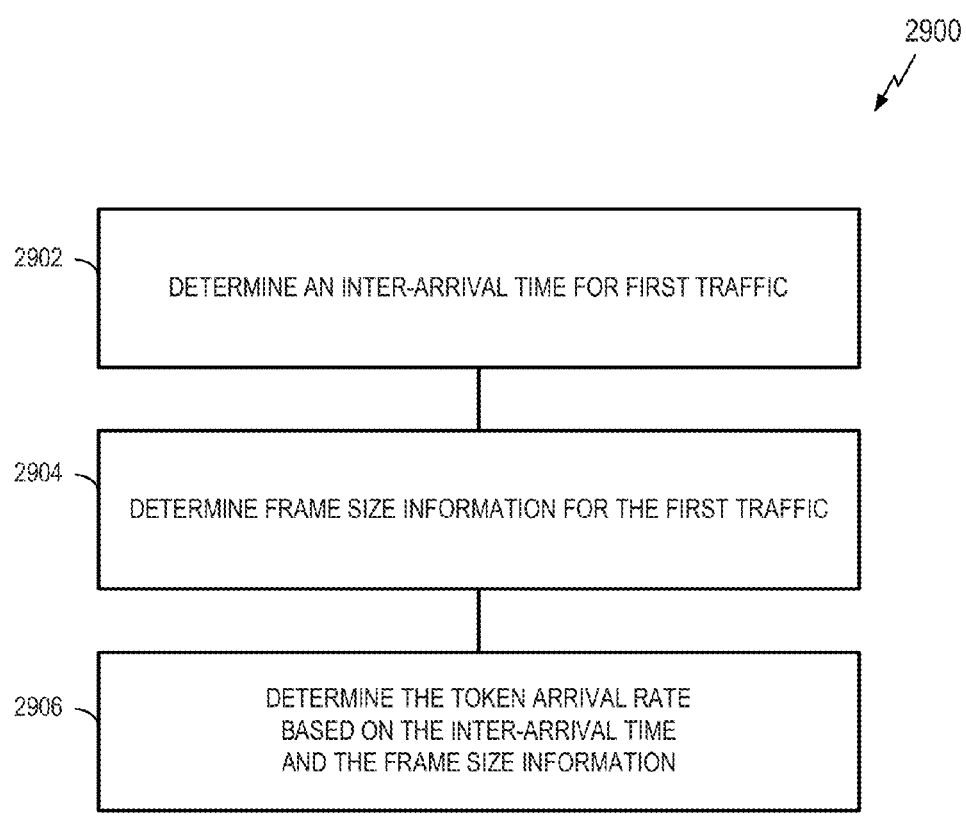
FIG. 29 is a flow diagram illustrating an example of another token arrival rate process in accordance with some aspects of the disclosure.

FIG. 29 illustrates a process 2900 for communication (e.g., determining a token arrival rate) in accordance with some aspects of the disclosure. In some implementations, the process 2900 may be performed in addition to (e.g., in conjunction with) the process 2700 of FIG. 27. The process 2900 may take place within a processing circuit (e.g., the processing circuit 2610 of FIG. 26), which may be located in a TRP, an access terminal, or some other suitable apparatus. In some implementations, the process 2900 represents operations performed, at least in part, by the TRP 102 of FIG. 1 or the TRP 201 of FIG. 2. Of course, in various aspects within the scope of the disclosure, the process 2900 may be implemented by any suitable apparatus capable of supporting rate setting-related operations.

At block 2902, an apparatus (e.g., a TRP) determines an inter-arrival time for first traffic. For example, a TRP may determine an inter-arrival time as discussed above in conjunction with block 2802 of FIG. 28. In some aspects, the first traffic may be wireless local area network (WLAN) traffic. In some aspects, the first traffic may be IEEE 802.11 traffic. In some aspects, the inter-arrival time may be a mean inter-arrival time.

In some implementations, the circuit/module for determining an inter-arrival time 2626 of FIG. 26 performs the operations of block 2902. In some implementations, the code for determining an inter-arrival time 2638 of FIG. 26 is executed to perform the operations of block 2902.

At block 2904, the apparatus determines frame size information for the first traffic. In some aspects, the frame size information may include a mean frame size and a frame size variance.

In some implementations, the circuit/module for determining frame size information 2628 of FIG. 26 performs the operations of block 2904. In some implementations, the code for determining frame size information 2640 of FIG. 26 is executed to perform the operations of block 2904.

At block 2906, the apparatus determines the token arrival rate based on the inter-arrival time (from block 2902) and the frame size information (from block 2904).

In some implementations, the circuit/module for determining a token arrival rate 2622 of FIG. 26 performs the operations of block 2906. In some implementations, the code for determining a token arrival rate 2634 of FIG. 26 is executed to perform the operations of block 2906.

Fourteenth Example Process

Figure 30:
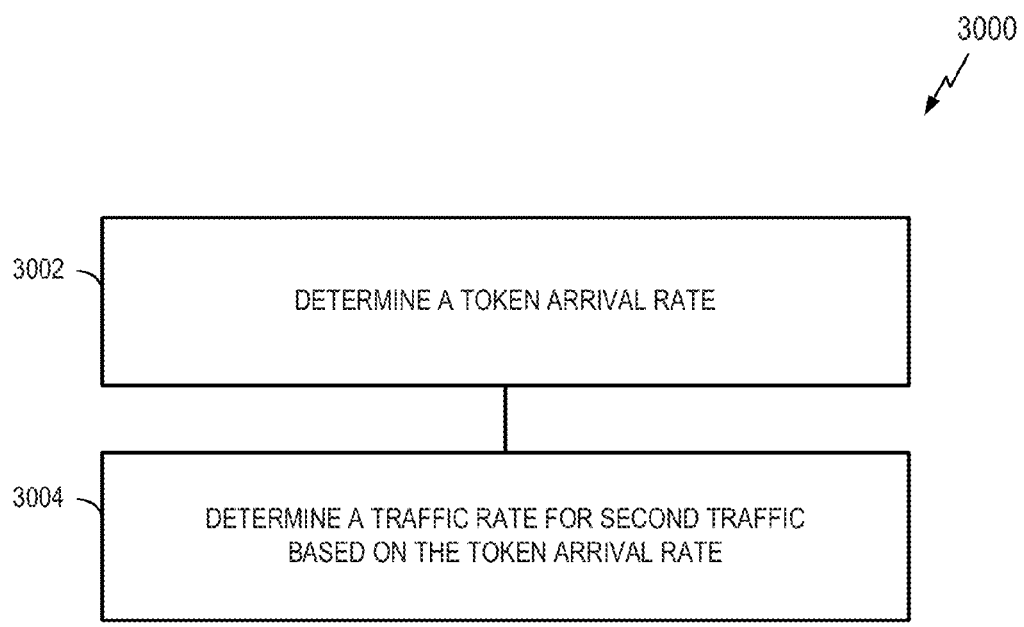
FIG. 30 is a flow diagram illustrating an example of a traffic rate process in accordance with some aspects of the disclosure.

FIG. 30 illustrates a process 3000 for communication in accordance with some aspects of the disclosure. In some implementations, the process 3000 may be performed in addition to (e.g., in conjunction with) the process 2700 of FIG. 27. The process 3000 may take place within a processing circuit (e.g., the processing circuit 2610 of FIG. 26), which may be located in a TRP, an access terminal, or some other suitable apparatus. In some implementations, the process 3000 represents operations performed, at least in part, by the TRP 102 of FIG. 1 or the TRP 201 of FIG. 2. Of course, in various aspects within the scope of the disclosure, the process 3000 may be implemented by any suitable apparatus capable of supporting rate setting-related operations.

At block 3002, an apparatus (e.g., a TRP) determines a token arrival rate. For example, a TRP may determine a token arrival rate as discussed above in conjunction with block 2704 of FIG. 27, block 2804 of FIG. 28, or block 2906 of FIG. 29.

In some implementations, the circuit/module for determining a token arrival rate 2622 of FIG. 26 performs the operations of block 3002. In some implementations, the code for determining a token arrival rate 2634 of FIG. 26 is executed to perform the operations of block 3002.

At block 3004, the apparatus determines a traffic rate for second traffic based on the token arrival rate determined at block 3002. In some aspects, the second traffic may be 5G traffic. For example, the TRP may generate a maximum 5G traffic arrival rate at block 3004. In some aspects, the determination of the traffic rate may include setting the traffic rate to be less than or equal to 0.9 times the token arrival rate.

In some implementations, the circuit/module for determining a traffic rate 2630 of FIG. 26 performs the operations of block 3004. In some implementations, the code for determining a traffic rate 2642 of FIG. 26 is executed to perform the operations of block 3004.

Example Network

Figure 31:
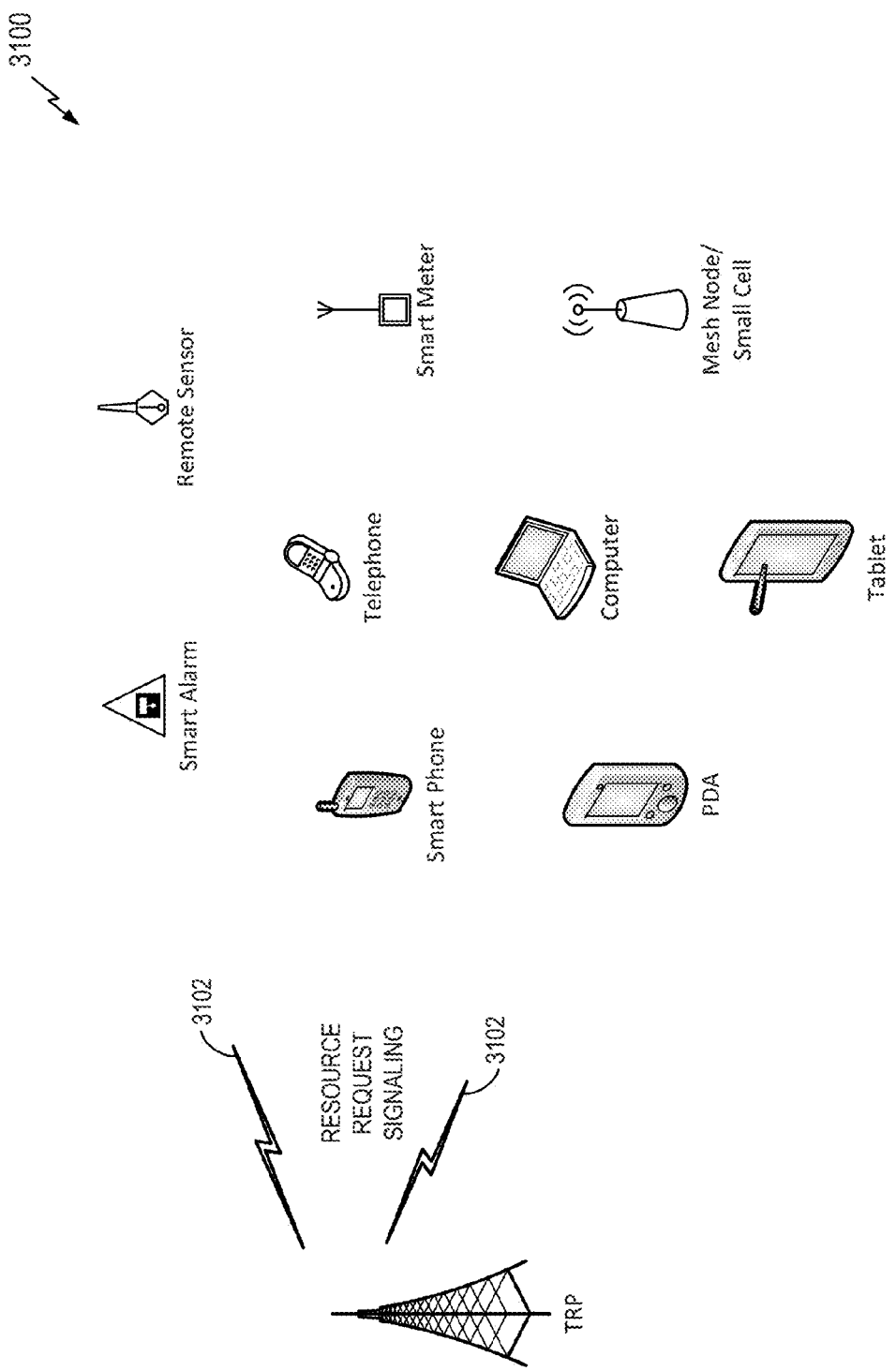
FIG. 31 is a schematic diagram of a wireless communication network within which one or more aspects of the disclosure may be implemented.

FIG. 31 is a schematic illustration of a wireless communication network 3100 including multiple communication entities as it may appear in some aspects of the disclosure. As indicated, some or all of the communication entities exchange resource request signaling 3102 (e.g., including uplink resource requirements) in accordance with the teachings herein. As described herein, a wireless communication device (e.g., as illustrated in FIGS. 1-2) may reside in, or be a part of, a TRP, a smart phone, a small cell, or other entity. Subordinate entities or mesh nodes may reside in, or be a part of, a smart alarm, a remote sensor, a smart phone, a telephone, a smart meter, a PDA, a personal computer, a mesh node, and/or a tablet computer. Of course, the illustrated devices or components are merely examples, and any suitable node or device may appear within a wireless communication network within the scope of the present disclosure.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of wireless communication, comprising:
communicating via a licensed radio frequency (RF) band;
determining that information is to be communicated via an unlicensed RF band;
generating an indication of a resource requirement for communication of the information via the unlicensed RF band;
determining whether the licensed RF band is available for sending the indication; and
sending the indication via the unlicensed RF band if the licensed RF band is not available for sending the indication, wherein the indication is sent to an entity that schedules at least one resource on the unlicensed RF band for communication of the information.

2. The method of claim 1, wherein the resource requirement comprises an uplink resource requirement for the unlicensed RF band.

3. The method of claim 1, further comprising sending the information over the unlicensed RF band at a time that is based on a token arrival time.

4. The method of claim 1, wherein the indication is sent via the licensed RF band if the licensed RF band is available for sending the indication.

5. The method of claim 4, wherein the indication is sent using 5G technology.

6. The method of claim 1, wherein the indication is sent using wireless local area network (WLAN) technology.

7. The method of claim 1, wherein the indication is sent using Institute of Electrical and Electronics Engineers (IEEE) 802.11 technology.

8. The method of claim 7, wherein the indication is sent via a null data packet (NDP) frame.

9. The method of claim 8, further comprising:
generating an error check sequence for the indication, wherein the error check sequence is generated using a first algorithm that is different from a second algorithm used for generating error check sequences for NDP frames; and including the error check sequence for the indication in the NDP frame.

10. The method of claim 8, further comprising:
generating an error check sequence for the indication;
inverting the error check sequence; and
including the inverted error check sequence in the NDP frame.

11. The method of claim 8, further comprising:
generating cyclic redundancy check (CRC) bits for the indication by applying an IEEE 802.11 NDP CRC generation algorithm to the indication;
flipping at least one of the CRC bits to generate modified CRC bits; and
including the modified CRC bits in the NDP frame.

12. A method of wireless communication, comprising:
receiving an indication of a resource requirement for communication of information via an unlicensed radio frequency (RF) band;
scheduling at least one resource on the unlicensed RF band for communication of the information; and
receiving the information over the unlicensed RF band according to the scheduled at least one resource and at a time that is based on a token arrival time.

13. The method of claim 12, wherein the resource requirement comprises an uplink resource requirement for the unlicensed RF band.

14. The method of claim 12, further comprising acknowledging receipt of the indication by sending a message comprising the indication.

15. The method of claim 12, wherein the indication is received via a null data packet (NDP) frame.

16. The method of claim 15, further comprising:
receiving an error check sequence for the indication; and
verifying the error check sequence using a first algorithm that is different from a second algorithm used for generating error check sequences for NDP frames.

17. The method of claim 12, further comprising:
receiving an error check sequence for the indication;
inverting the error check sequence; and
verifying the inverted error check sequence.

18. An apparatus for wireless communication, comprising:
a memory; and
a processor coupled to the memory,
the processor and the memory configured to:
communicate via a licensed radio frequency (RF) band;
determine that information is to be communicated via an unlicensed RF band;
generate an indication of a resource requirement for communication of the information via the unlicensed RF band;
determine whether the licensed RF band is available for sending the indication; and
send the indication via the unlicensed RF band if the licensed RF band is not available for sending the indication, wherein the indication is sent to an entity that schedules at least one resource on the unlicensed RF band for communication of the information.

19. The apparatus of claim 18, wherein the resource requirement comprises an uplink resource requirement for the unlicensed RF band.

20. The apparatus of claim 18, wherein the indication is sent via a null data packet (NDP) frame.

21. The apparatus of claim 20, wherein the processor and the memory are further configured to:
generate an error check sequence for the indication, wherein the error check sequence is generated using a first algorithm that is different from a second algorithm used for generating error check sequences for NDP frames; and
include the error check sequence for the indication in the NDP frame.

22. The apparatus of claim 20, wherein the processor and the memory are further configured to:
generate an error check sequence for the indication;
invert the error check sequence; and
include the inverted error check sequence in the NDP frame.

23. An apparatus for wireless communication, comprising:
a memory; and
a processor coupled to the memory,
the processor and the memory configured to:
receive an indication of a resource requirement for communication of information via an unlicensed radio frequency (RF) band;
schedule at least one resource on the unlicensed RF band for communication of the information; and
receive the information over the unlicensed RF band according to the scheduled at least one resource and at a time that is based on a token arrival time.

24. The apparatus of claim 23, wherein the resource requirement comprises an uplink resource requirement for the unlicensed RF band.

25. The apparatus of claim 23, wherein the indication is received via a null data packet (NDP) frame.

26. The apparatus of claim 25, wherein the processor and the memory are further configured to:
receive an error check sequence for the indication; and
verify the error check sequence using a first algorithm that is different from a second algorithm used for generating error check sequences for NDP frames.

27. The apparatus of claim 23, wherein the processor and the memory are further configured to:
receive an error check sequence for the indication;
invert the error check sequence; and
verify the inverted error check sequence.

* * * * *